May 24, 1955

L. C. PEARCE 2,708,760

MANIFOLD PACK MAKING MACHINE

Filed Jan. 11, 1952

INVENTOR.
LEWIS C. PEARCE

BY

Mellin and Hanscom
ATTORNEYS

May 24, 1955

L. C. PEARCE 2,708,760

MANIFOLD PACK MAKING MACHINE

Filed Jan. 11, 1952

INVENTOR.
LEWIS C. PEARCE
BY
Mellin and Hanscom
ATTORNEYS

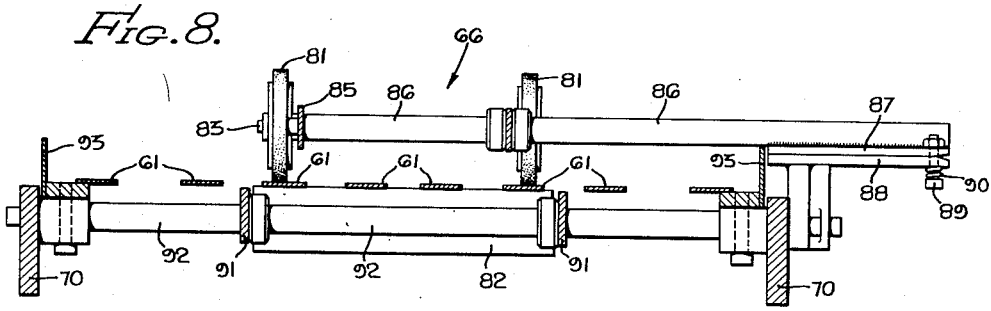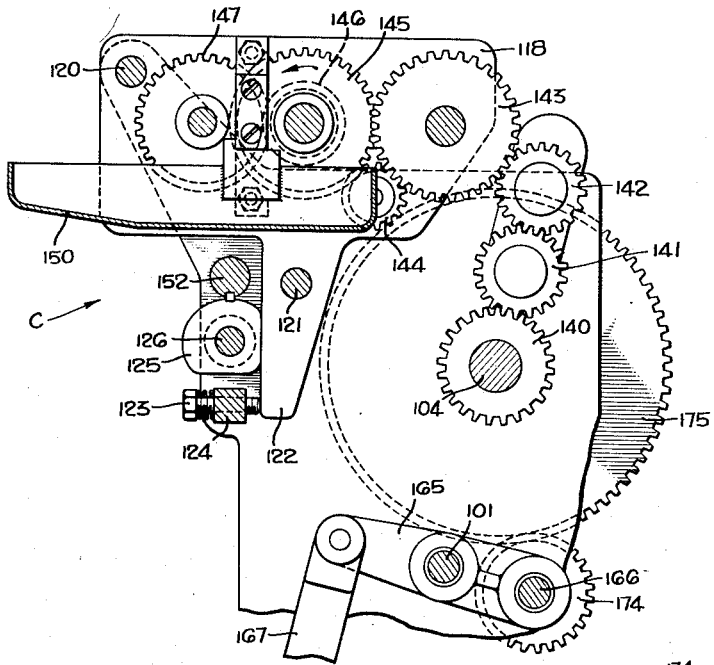

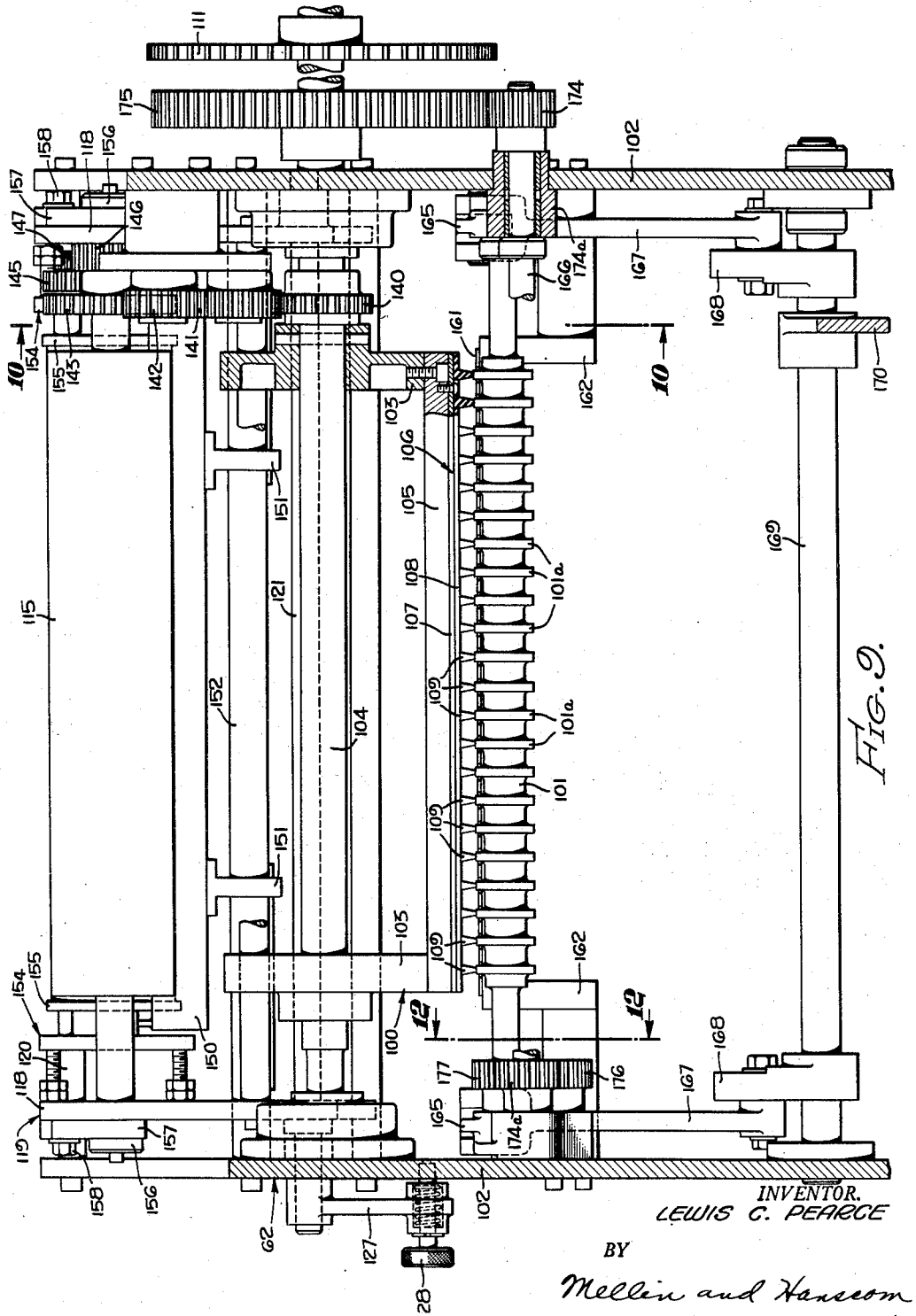

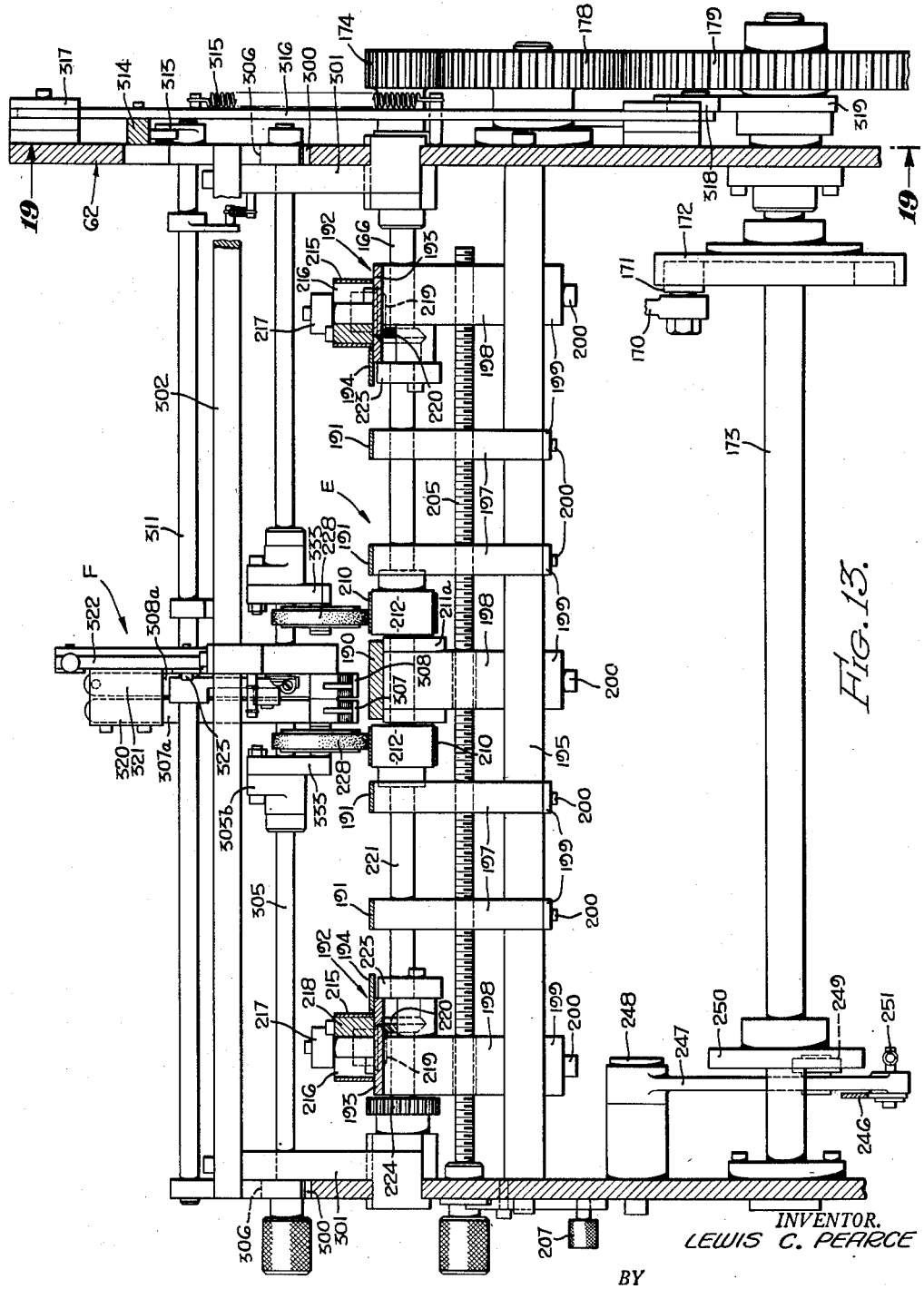

May 24, 1955 L. C. PEARCE 2,708,760
MANIFOLD PACK MAKING MACHINE
Filed Jan. 11, 1952 20 Sheets-Sheet 11

INVENTOR.
LEWIS C. PEARCE
BY
Mellin and Hanscom
ATTORNEYS

May 24, 1955 — L. C. PEARCE — 2,708,760
MANIFOLD PACK MAKING MACHINE
Filed Jan. 11, 1952 — 20 Sheets-Sheet 12
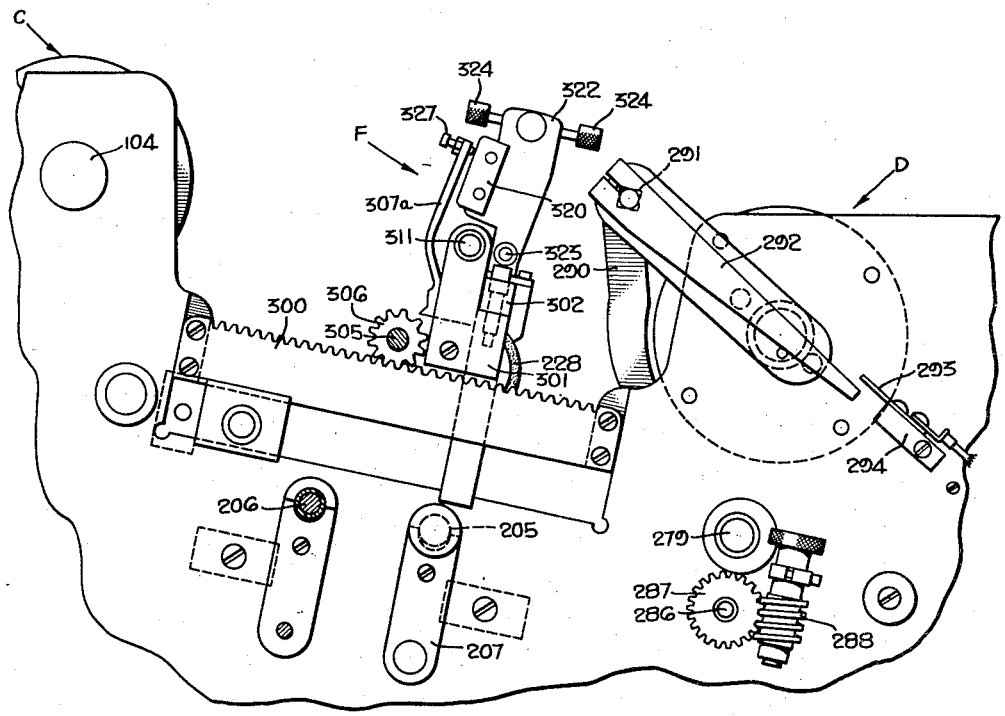
Fig. 16.
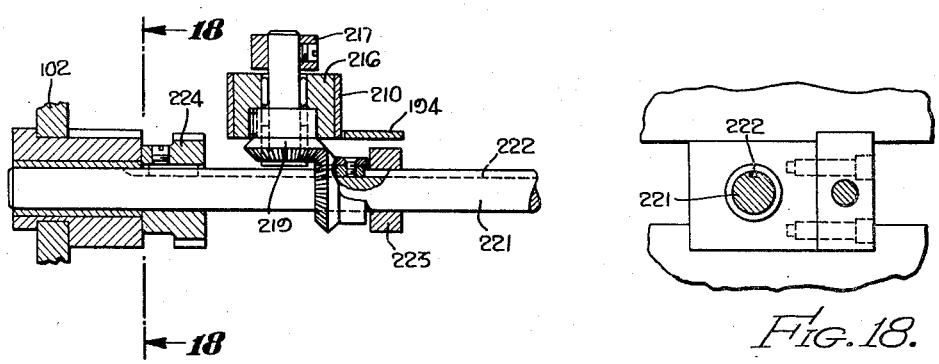
Fig. 17.
Fig. 18.
INVENTOR.
LEWIS C. PEARCE
BY
Mellin and Hanscom
ATTORNEYS May 24, 1955
L. C. PEARCE
2,708,760
MANIFOLD PACK MAKING MACHINE
Filed Jan. 11, 1952
20 Sheets-Sheet 13
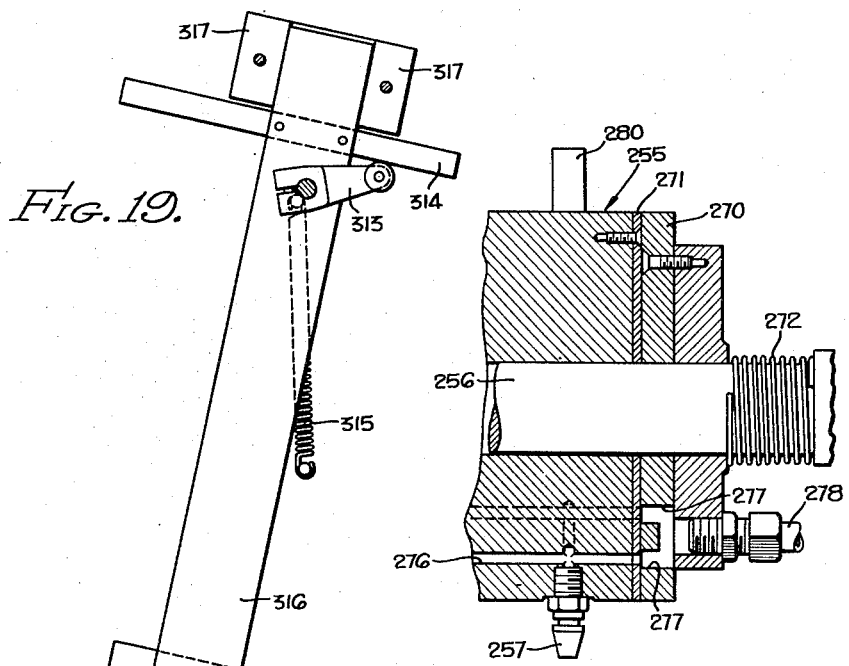
Fig. 19.
Fig. 28.
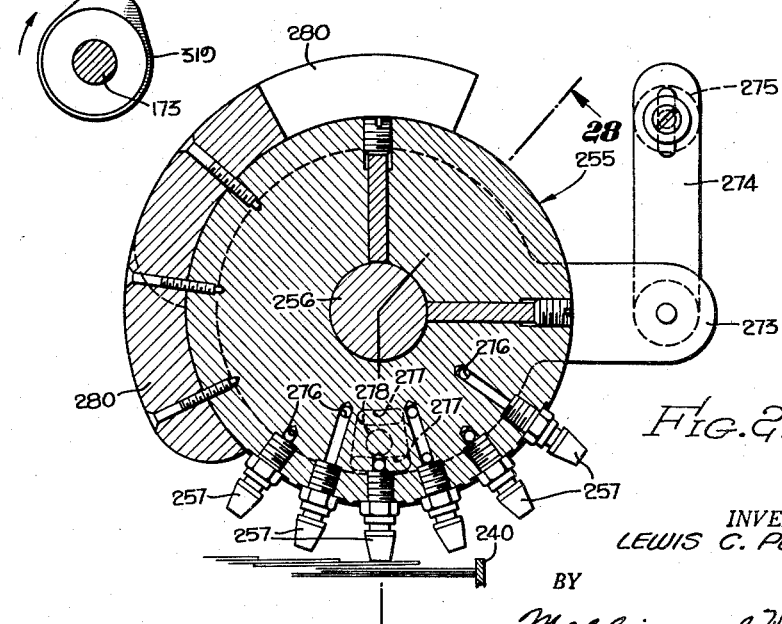
Fig. 27.
INVENTOR.
LEWIS C. PEARCE
BY
Mellin and Hanscom
ATTORNEYS May 24, 1955  L. C. PEARCE  2,708,760
MANIFOLD PACK MAKING MACHINE
Filed Jan. 11, 1952. 20 Sheets-Sheet 17
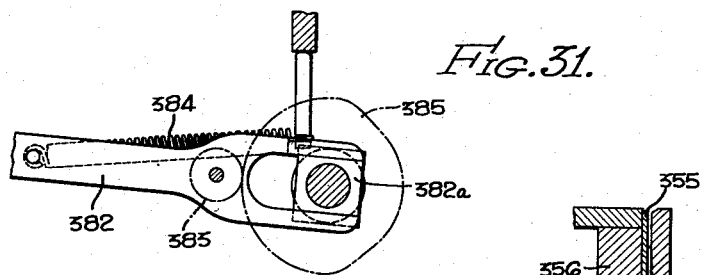
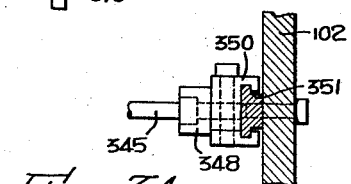
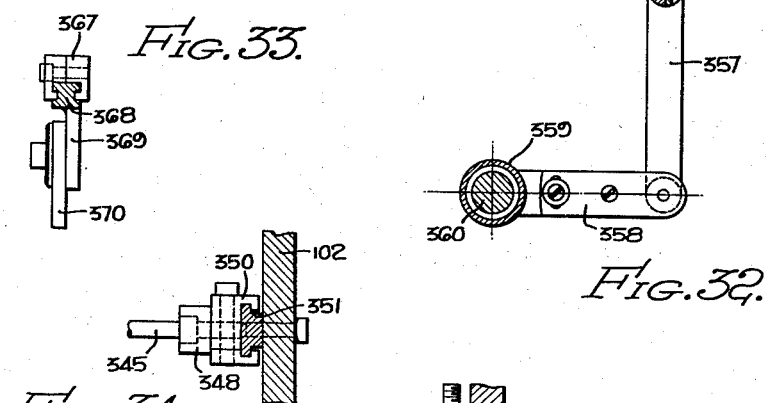
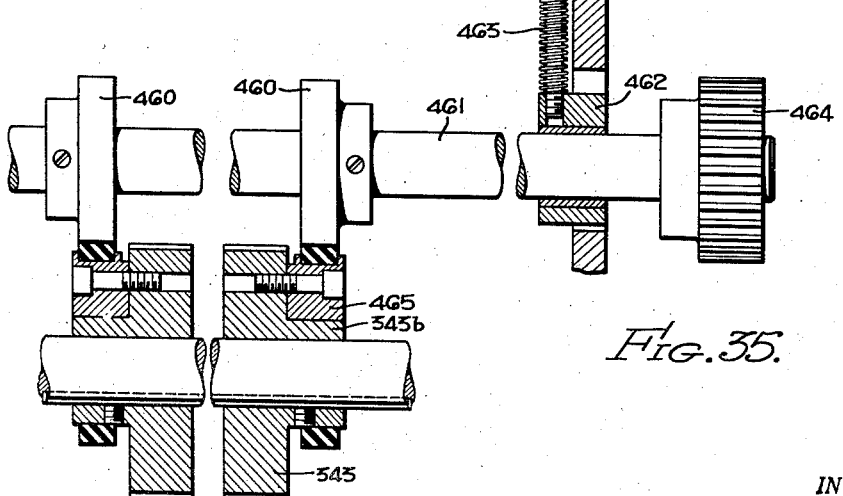
INVENTOR.
LEWIS C. PEARCE
BY
Mellin and Hanscom
ATTORNEYS

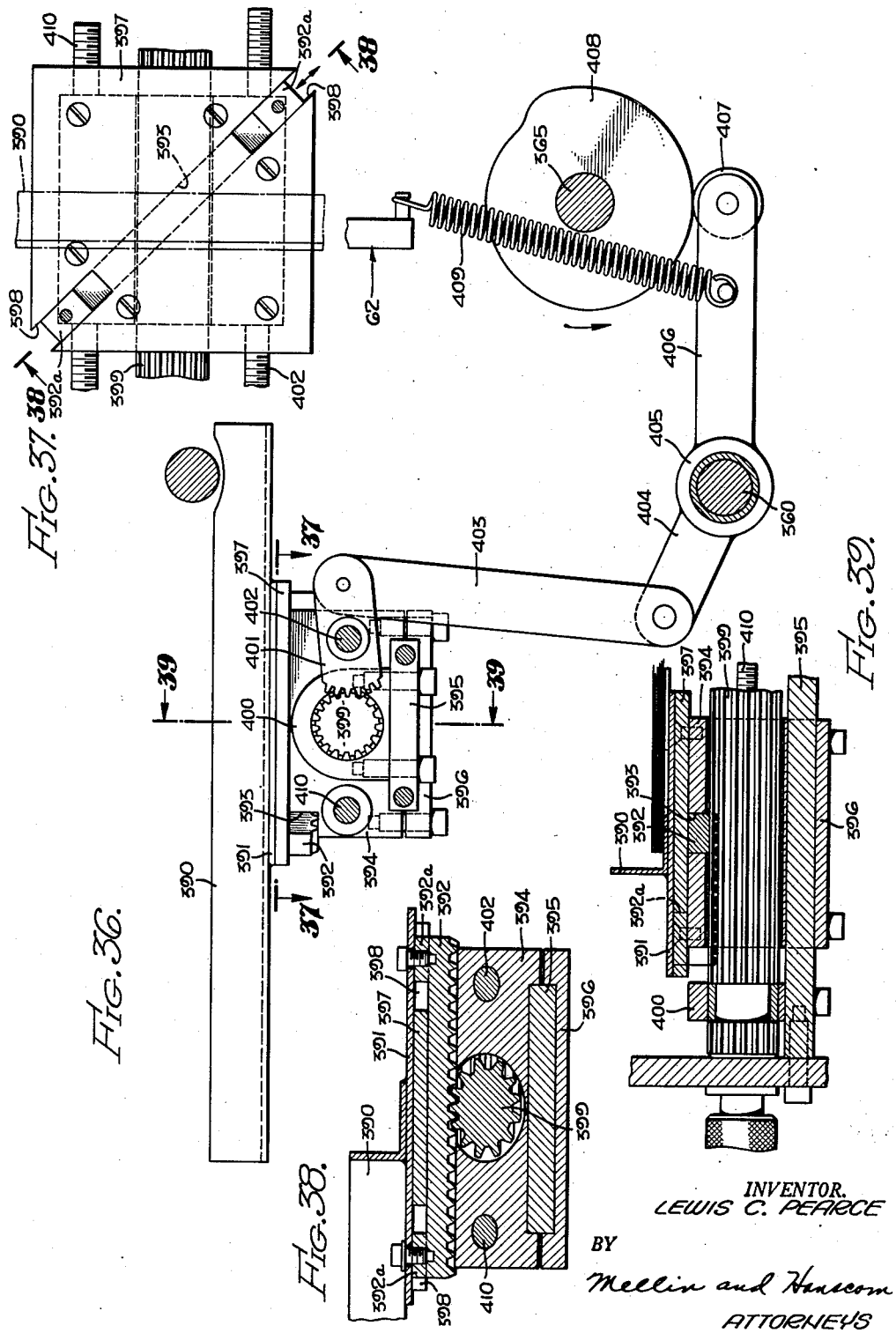

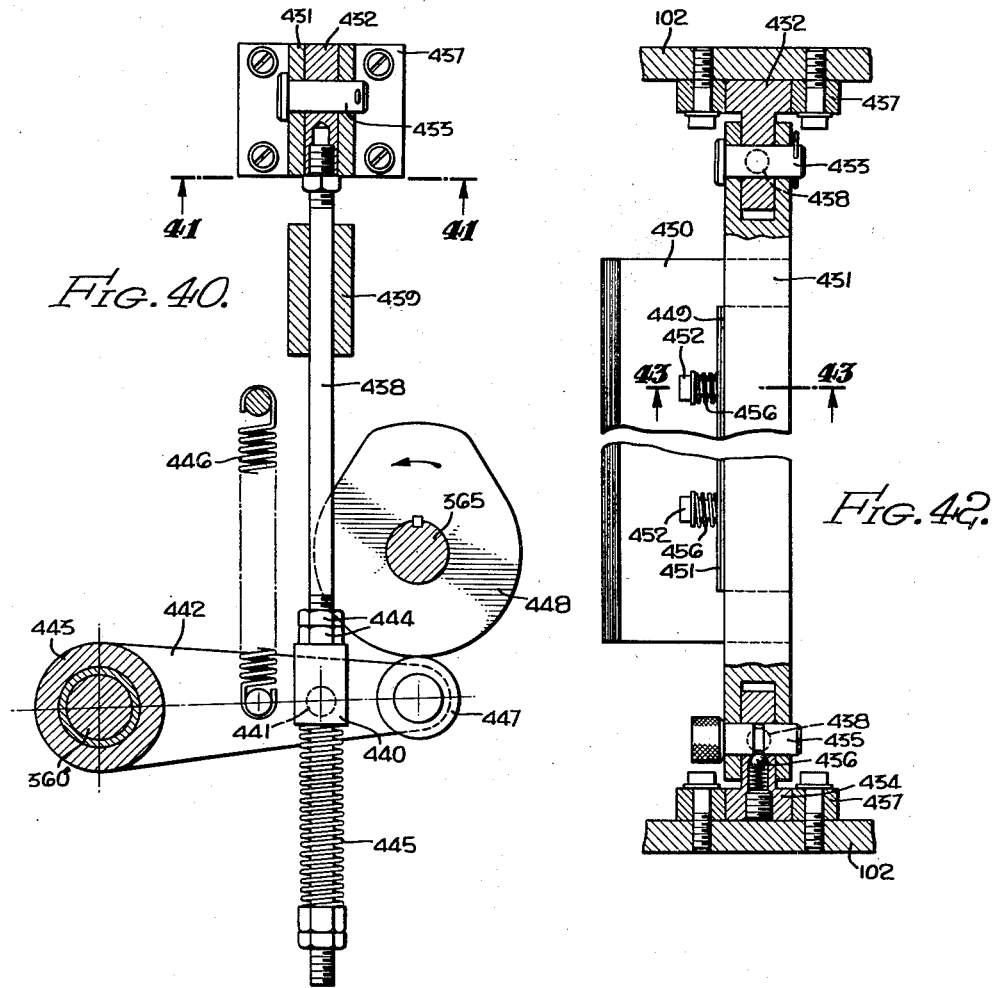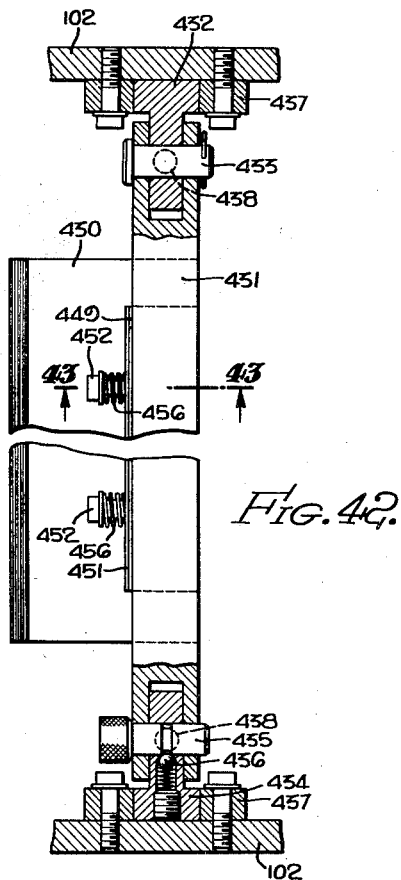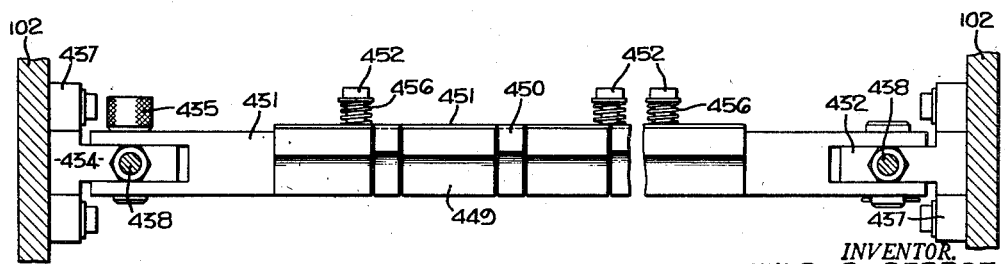

May 24, 1955 — L. C. PEARCE — 2,708,760
MANIFOLD PACK MAKING MACHINE
Filed Jan. 11, 1952 — 20 Sheets-Sheet 20
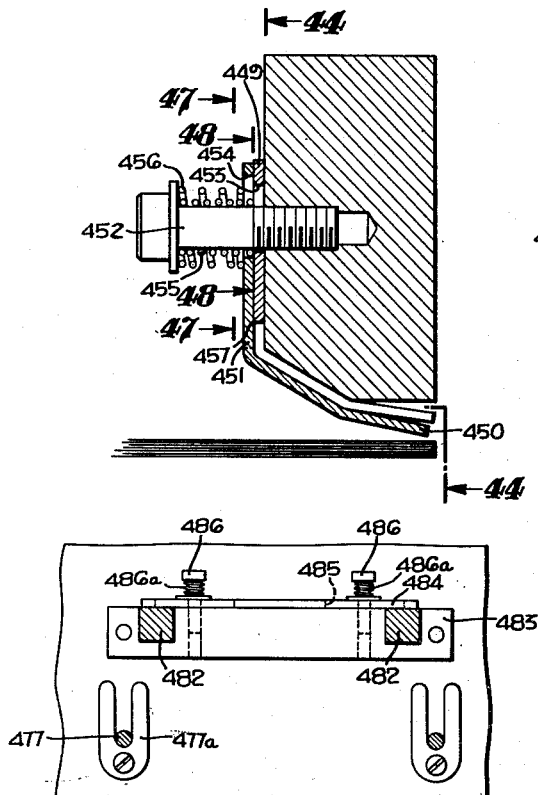
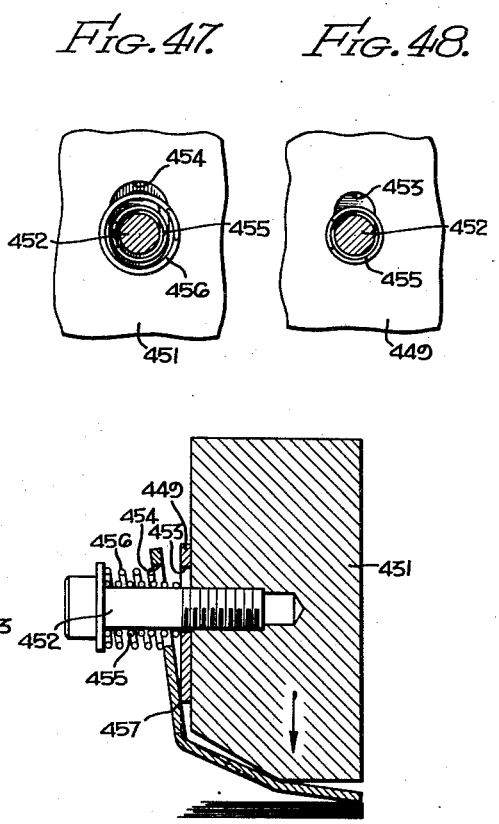
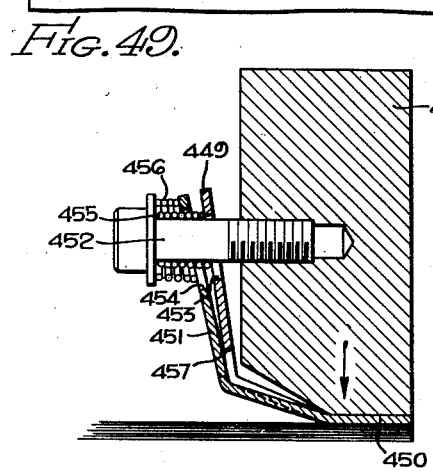
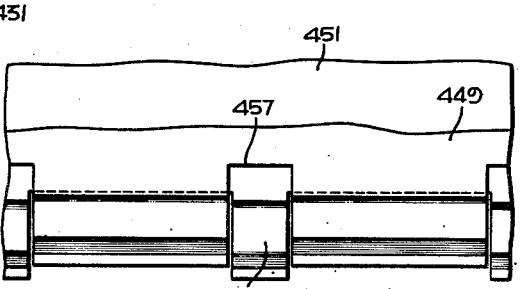
INVENTOR.
LEWIS C. PEARCE
BY
Meelin and Hanscom
ATTORNEYS

United States Patent Office 2,708,760
Patented May 24, 1955

2,708,760
MANIFOLD PACK MAKING MACHINE

Lewis C. Pearce, Berea, Ohio, assignor to Pearce Development Company, Cleveland, Ohio, a corporation Application January 11, 1952, Serial No. 266,075

39 Claims. (Cl. 11—1)

This invention relates to a device for performing operations on sets of sheets of paper and like material, and particularly on sets of sheets of paper in which the sheets of each set are initially in a spread, shingled or fanned condition.

It is a main object of the present invention to provide a machine for receiving sets of sheets of paper, in which the sheets of each set are in spread condition, applying adhesive material to the exposed portions of the sheets and then accumulating or arranging the sheets in registered condition.

It is another object of the present invention to provide a machine as above described in which there is a mechanism for applying adhesive material to a set of sheets in spread condition, which mechanism includes a pair of opposed rotary members, one rotary member being an adhesive or glue applicator and the other member being a back-up roll, and in which machine there is a mechanism for progressively separating the rotary members as the spread sheets pass therebetween so as to compensate for the increased thickness of the set of sheets as it passes between the rotary members, whereby the sheets of a set will have adhesive material uniformly applied thereto.

A further object of the present invention is to provide a machine, as initially described above, including an accumulator mechanism for picking up the penultimate sheet first and then the upper sheets in order and depositing them in stacked approximately registered condition thereby avoiding scraping of the adhesive material on the sheets and buckling of the sheets which would occur if the sheets were merely shoved together.

Still another object of the present invention is to provide a machine as described immediately above in which there is a mechanism for receiving the sets of sheets from the accumulator mechanism for accurately registering the sheets by kicking each set of approximately registered sheets at the sides and ends by two sets of kicker members, and which machine includes means for pressing the overlapped glued portions together to ensure good adhesion of the sheets to one another.

A still further object of the present invention is to provide a machine as described immediately above in which the latter-named means is constructed and operated so that the pressing operation begins at the edges of the margins which have adhesive material applied thereto and proceeds inwardly into the body of the margin so that the adhesive material is squeezed inwardly and not outwardly of the registered sheets, thereby avoiding the difficulties encountered in handling sets of sheets having exposed beads or deposits of adhesive material.

Still a further object of the present invention is to provide a machine as initially described in which there is a mechanism for gauging the thickness of the registered sheets after the sheets are accumulated for stopping operation of the machine if the number of sheets in the registered stack is either less or more than the desired number of sheets.

Another object of the present invention is to provide a machine as initially described above in which there is a slitting mechanism operable to slit a registered stack of sheets into several portions.

A further object of the present invention is to provide a sheet accumulating machine particularly adapted to receive sets of paper from a collating machine by means of a suitable belt conveyor unit, which belt conveyor unit is so constructed that parts thereof can be removed to allow an out-feed unit to be inserted between the machines so that the sheets of paper can be fed at right angles from the end of the collating machine instead of to the accumulating machine.

Various other objects of the present invention will be apparent from the following description taken in connection with the accompanying drawings wherein:

Fig. 8 is a vertical transverse section of the conveying mechanism for conveying sets of sheets of paper to the glue applicator mechanism and being taken along line 8—8 of Fig. 5;

Fig. 9 is a vertical transverse section through the machine taken generally along line 9—9 of Fig. 2, showing further details of the glue applicator mechanism;

Fig. 10 is a fragmentary vertical sectional view taken in side elevation along line 10—10 of Fig. 9, showing the glue pot and the associated mechanism for transferring adhesive material from the glue pot to the glue applicator cylinder;

Fig. 11 is a fragmentary view taken in side elevation from the work side of the machine, showing various adjustments for the glue pot and its associated mechanism;

Fig. 12 is a fragmentary vertical sectional view taken along line 12—12 of Fig. 9;

Fig. 13 is a vertical transverse sectional view taken along line 13—13 of Fig. 3 and showing, among other things, the construction and drive for the side conveying belts located in the vicinity of the feeler mechanism;

Fig. 16 is a fragmentary view in side elevation taken generally in the direction in which Fig. 3 is taken but from the outside of the work side of the machine and showing, among other things, the mechanism for adjusting the feeler mechanism longitudinally of the machine;

Fig. 17 is an enlarged vertical transverse fragmentary section taken along line 17—17 of Fig. 6 and showing specifically the mounting of a pulley for a side conveying belt;

Fig. 18 is a sectional view taken along line 18—18 of Fig. 17;

Fig. 19 is a vertical longitudinal sectional view taken along line 19—19 of Fig. 13 and showing the arrangement for operating the feeler mechanism;

Fig. 24 is a vertical transverse sectional view taken along line 24—24 of Fig. 3 and showing a part of the sheet accumulator mechanism;

Fig. 25 is a sectional view taken along line 25—25 of Fig. 24;

Fig. 26 is a sectional view taken along line 26—26 of Fig. 25;

Fig. 27 is an enlarged cross sectional view taken along line 27—27 of Fig. 24 and showing the internal construction of the accumulator cylinder;

Fig. 31 is a sectional view taken along line 31—31 of Fig. 30 and showing part of the drive for the end kicking mechanism;

Fig. 32 is a sectional view taken along line 32—32 of Fig. 30 and showing part of the mechanism for actuating the stop at which the sheets of a set of sheets are accurately registered with one another;

Fig. 33 is a sectional view taken along line 33—33 of Fig. 7 and showing the construction of one of the end pad kickers;

Fig. 34 is a sectional view taken along line 34—34 of Fig. 4 and showing the arrangement for longitudinally adjusting the upper rollers located in the vicinity of the side and end kicking mechanisms for the machine;

Fig. 35 is a transverse section taken along line 35—35 of Fig. 4 and showing a portion of the nipper drive for advancing a set of sheets into the slitting mechanism;

Fig. 36 is a vertical longitudinal sectional view taken along line 36—36 of Fig. 7 and showing part of the drive for the side kickers;

Fig. 37 is a horizontal sectional view taken along line 37—37 of Fig. 36;

Fig. 38 is a sectional view taken along line 38—38 of Fig. 37;

Fig. 39 is a sectional view taken along line 39—39 of Fig. 36;

Fig. 40 is a vertical sectional view taken along line 40—40 of Fig. 29, showing part of the drive for the pressure bar;

Fig. 41 is a horizontal sectional view taken along line 41—41 of Fig. 40, showing the construction of the pressure bar;

Fig. 42 is a top plan view of the pressure bar with parts broken away to show the manner of mounting the pressure bar;

Fig. 43 is a sectional view of the pressure bar taken along line 43—43 of Fig. 42, showing the positions of the parts prior to engagement with a set of sheets;

Fig. 44 is a view of the pressure and stripper plates taken along line 44—44 of Fig. 43;

Fig. 45 is a view similar to Fig. 43, showing the parts in an initial stage of engagement with a set of sheets;

Fig. 46 is a view similar to Fig. 43 showing the parts in full engagement with a set of sheets;

Fig. 47 is a sectional view taken along line 47—47 of Fig. 43;

Fig. 48 is a sectional view taken along line 48—48 of Fig. 43;

Fig. 49 is a sectional view taken along line 49—49 of Fig. 7 showing the manner of mounting the rollers in the slitting mechanism.

*General description*

Figure 1:
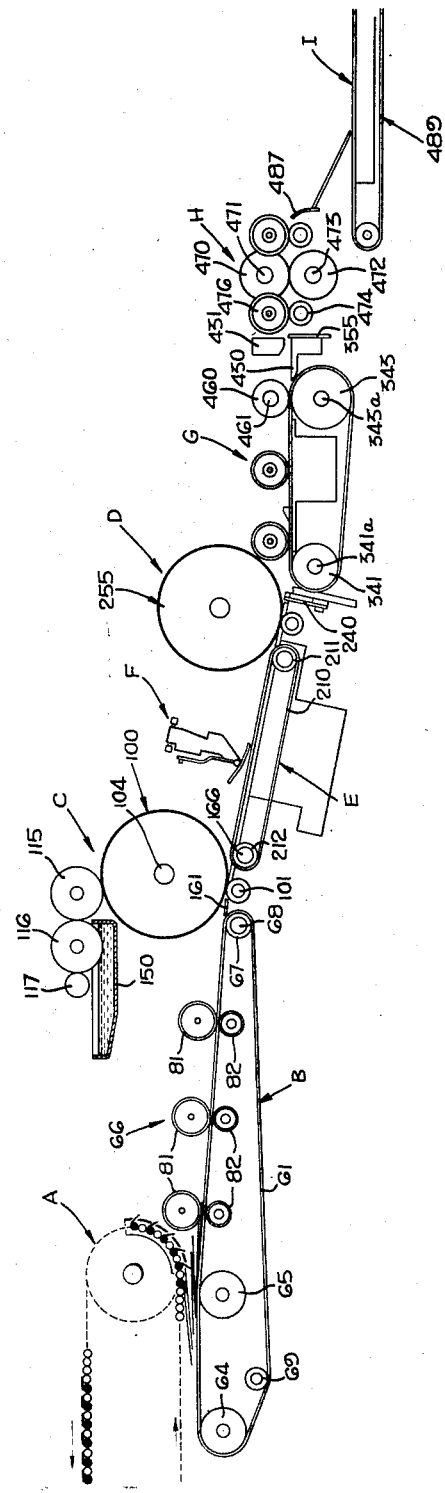
Fig. 1 is a schematic view of a sheet accumulating machine embodying the concepts of the present invention.

The purpose of the overall machine as disclosed in Fig. 1 is to receive in successive fashion spread sheets of paper from another machine, such as a collating machine as disclosed in my prior co-pending application entitled Collating Machine, Serial No. 189,362, filed October 10, 1950, and to apply adhesive material to the exposed portions of the sheets and thereafter accumulate and register the sheets and then preferably to slit the set of sheets to provide several portions.

Referring to Fig. 1, there is shown the end of a collating machine generally entitled A adapted to deposit sets of spread, fanned or shingled sheets onto a conveying mechanism B which is adapted to convey the sets of sheets in successive fashion to a glue applicator mechanism, generally entitled C, which applied glue or adhesive material to parts of the exposed portions of the sheets of each set. The glue applicator mechanism is arranged to operate in timed relation to depositing of sets of sheets onto the conveyor mechanism B, and therefore in the particular arrangement shown, the glue applicator mechanism is driven from the delivery end of the collating machine. In other arrangements, the glue applicator mechanism will be arranged to be driven in timed relation to whatever machine is provided for depositing sets of sheets onto the conveying mechanism B.

Operating in timed relation to operation of the glue applicator mechanism and driven by the same, is an accumulator mechanism generally entitled D, adapted to have sets of sheets conveyed thereto by a conveying mechanism E, above which is disposed a feeler mechanism F, operable in timed relation to operation of the accumulator mechanism to gauge the set of sheets after the sheets thereof have been approximately registered, to stop the machine whenever the thickness of a set of sheets is greater or less than the desired thickness, to thereby indicate whenever a sheet or sheets are missing from a set or whenever there is an extra sheet or sheets in a set of sheets.

Operating in timed relation to and driven by the accumulator mechanism is an accurate registering mechanism generally entitled G adapted to kick or jog successive sets of sheets at the sides and ends thereof so as to accurately register the same. Operating in conjunction with the accurate registering mechanism is a pressure bar for applying pressure to the overlapped portions of a set of sheets having the adhesive material applied thereto so as to ensure a good bond between the sheets of each set.

At the delivery end of the machine is a slitting mechanism H adapted to receive the sets of sheets from the accurate registering mechanism G and to slit the sets of sheets into a desired number of portions and to deposit the same onto a creeper conveying mechanism I. Although it is preferable that a slitting mechanism be provided, such mechanism can be considered optional.

Throughout the specification, for purposes of ease in description, the side of the machine containing the drives for the various mechanisms will be referred to as the gear side of the machine, and the opposite side of the machine, on which various handles, levers or the like are located for adjusting and operating parts of the machine, will be referred to as the work side of the machine. Furthermore, the delivery end of the machine will be referred to as the forward portion of the machine and the portion of the machine opposite the delivery end of the collating machine will be referred to as the rearward portion of the machine. Still further, for purposes of illustration only, a set of sheets has been disclosed having six individual sheets, but this, of course, is not intended to limit the invention but is utilized only for purposes of illustration.

Conveying mechanism B

Referring to Figs. 1, 2, 5 and 8, it can be seen that the delivery end of the collating machine A is adapted to deposit sets of spread sheets onto a plurality of conveyor belts 61 which convey the sets of sheets in successive fashion to the glue applicator mechanism C. Conveyor belts 61 are supported partly from the forward end of the frame 62 of the overall machine of the present invention and partly from the frame 63 of the collating machine.

Specifically, the upper reaches of the conveyor belts 61 are supported by a set of pulleys 64 at their left hand ends, by a set of pulleys 65 just beneath the delivery end of the collating machine, by a removable roller mechanism generally entitled 66, and by a set of pulleys 67 formed on a shaft 68, the latter being disposed at the extreme forward ends of the conveyor belts 61. The conveyor belts are also trained over a set of pulleys 69 on the lower reaches thereof, see Fig. 1. Pulleys 64, 65 and 69 are supported from the frame 63 of the collating machine, whereas pulleys 67 are supported from an auxiliary frame 70 removably fastened at its forward end to frame 62 of the machine of the present invention by spacers 71. Auxiliary frame 70 is removably attached at its opposite end by tie plates 72 to the rear end of frame 63 of the collating machine, and therefore auxiliary frame 70 can be entirely removed from between the frames of the two major machines to allow an outfeed unit to be inserted between the collating machine and the sheet accumulating machine to feed sheets delivered by the collating machine at right angles from the line of travel shown in Fig. 5, so as to permit the sheets to be manipulated in various other manners, such as accumulating sets of sheets and collating sets of sheets, and the like.

Pulleys 64, 65 and 69 are driven by an endless chain 80 provided at the delivery end of the collating machine so as to drive the conveyor belts 61.

Figure 5:
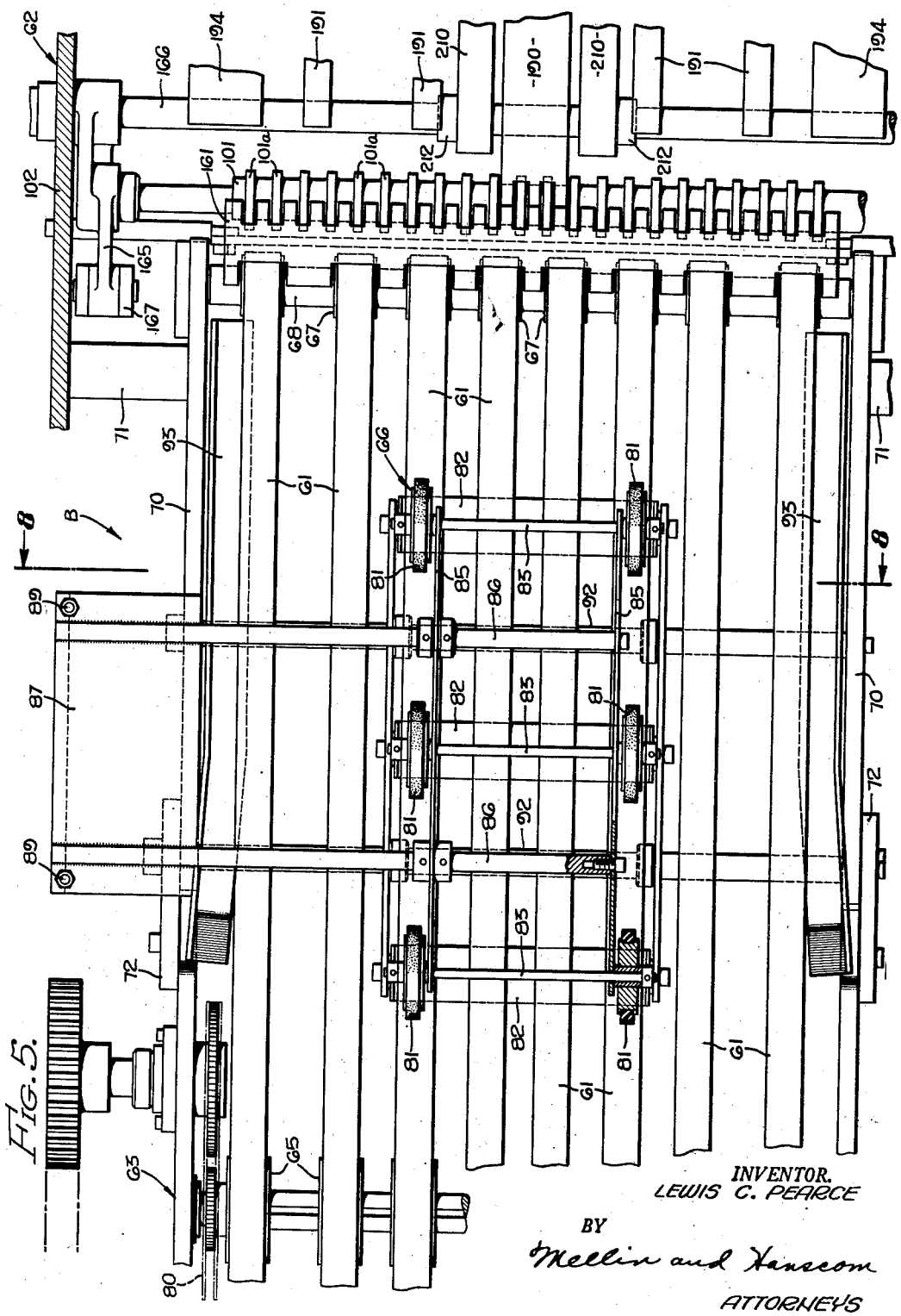
Fig. 5 is a horizontal sectional view taken along line 5—5 of Fig. 2.

Mounted on auxiliary frame 70 and removable therewith is the roller mechanism 66 previously referred to. This roller mechanism includes an upper set of rollers comprising three pairs of rubber-covered rollers 81, and a lower set of 3 back-up cylinders 82 adapted to back up conveying belts 61 underneath the places of engagement of rollers 81 so as to convey sets of sheets forwardly to the glue applicator mechanism. Rollers 81 are rotatably mounted on shafts 83 rotatably received within vertically elongated slots 84 provided in bearing members 85. Bearing members 85 are secured to and supported by the ends of a pair of shafts 86, the opposite ends of which shafts are secured to an upper plate 87 which rests on a lower plate 88, the latter being supported from the auxiliary frame 70. As best shown in Figs. 5 and 8, plates 87 and 88 are pivotally joined at their outer ends by a pair of bolts 89 receivable through clearance slots in lower plate 88 and have compression springs 90 therearound to urge the plates into surface contact. The outer margins or edges of the plates are beveled as shown in Fig. 8 to allow rollers 81 to be pivoted upwardly, with upper plate 87 pivoting on lower plate 88 at about the location of bolts 89 to permit sets of sheets which have been erroneously collated or otherwise defective to be removed.

Cylinders 82 disposed beneath rollers 81 are rotatably supported in bearing members 91 supported by a pair of shafts 92 which are affixed to the sides of auxiliary frame 70.

Also fixed to the sides of auxiliary frame 70 are a pair of transversely spaced angle-shaped guide members 93 having their left hand ends diverging as shown in Fig. 5, to receive sets of sheets carried along by conveying belts 61 and maintain the sheets in approximate lateral alignment.

Figure 2:
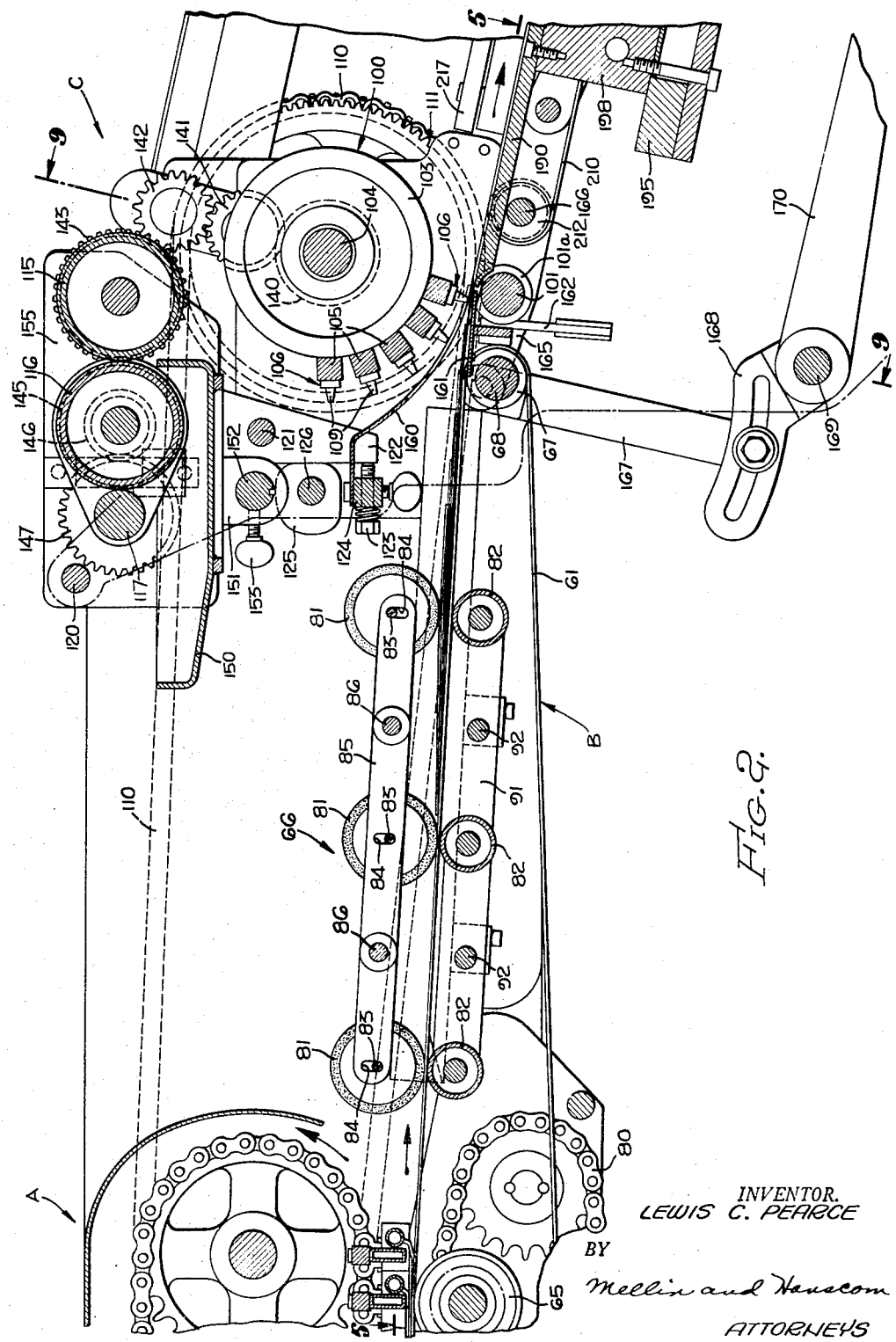
Fig. 2 is an enlarged view in side elevation showing the forward portion of the machine disclosed in Fig. 1, and particularly showing the glue applicator mechanism.

As is shown in Fig. 2, elongated slots 84 allow rollers 81 to move upwardly or downwardly in conformity with the thickness of the set of sheets passing thereunder, and yet to apply a light pressure to these sheets to ensure their conveyance to the glue applicator mechanism. As shown in Fig. 1, conveying mechanism B is inclined downwardly toward the delivery end of the machine so that the force of gravity aids feeding of the sheets.

The machine of the present invention, though not being restricted to, is particularly adapted for the handling of sheets having carbon deposited upon portions thereof, and to that end certain devices and contrivances throughout the machine have been constructed so as not to smear carbon on sheets or leave pressure marks thereon.

Glue applicator mechanism

Referring particularly to Figs. 1, 2, 5 and 8 through 12, there is disclosed the glue applicator mechanism C comprising generally an upper rotary glue applicator cylinder 100 cooperable with a lower rotary back-up roll 101 which is adapted to be progressively lowered as the gluing operation progresses to apply uniform pressure to the sheets and therefore uniformly apply adhesive material thereto.

Frame 62 of the sheet accumulating machine, previously referred to, includes sides 102 joined together by various cross members to be described hereinafter in detail. Glue applicator cylinder 100 comprises a pair of circular flanges 103 (see Fig. 9) secured to a shaft 104, which is journaled in the sides 102 of frame 62. Circular flanges 103 have mounted thereon a plurality of bars 105 equal in number to the number of sheets per set, less one. That is, every sheet of each set will have adhesive material applied thereto with the exception of the uppermost sheet. Each of bars 105 has a strip 106 secured thereto as shown in Fig. 9, said strip comprising a metal backing 107 and a rubber or resilient strip 108 formed with a plurality of protuberances 109 thereon. These protuberances are adapted to have their peripheral faces coated with an adhesive material in a manner to be described and are adapted to apply the adhesive material to the exposed portions of the sheets of a set of sheets passing through the glue applicator mechanism.

Shaft 104 of glue applicator cylinder 100 is driven from the delivery end of the collating machine by a chain 110 (see Fig. 2) which drives a sprocket 111 (compare Figs. 2 and 9) secured to said shaft. It is apparent, therefore, that the glue applicator mechanism is driven in timed relation to the depositing of sheets on the conveyor B, and, therefore, the glue applicator cylinder 100 will be rotated so that the first row of protuberances 109, as shown in Fig. 2, will apply adhesive spots to the penultimate sheet, and the next row of protuberances 109 will apply adhesive spots to the exposed portion of the upper adjacent sheet, and the remaining rows will apply adhesive spots to the remaining sheets except for the uppermost sheet to which no adhesive spots are applied.

Above the glue applicator cylinder 100 and adapted to apply glue to the protuberances 109 is a glue pot mechanism including a transfer roll 115, a dipping roll 116 and a wiper roll 117. These three rolls are journaled at their ends in the sides 118 of an auxiliary frame 119 pivotally mounted in the sides 102 of the main frame of the machine on a pivot shaft 120. Shaft 120 is pivotally journaled at its ends in the sides 102 of the main frame 62, whereby upon pivoting of the auxiliary frame, transfer roll 115 is separated from the path of travel of the faces of protuberances 109 so that the sheet accumulating mechanism can be run without coating the protuberances, therefore, allowing the machine to be run for test purposes and the like.

Sides 118 of auxiliary frame 119 are joined by a tie rod 121 (see Fig. 2) and have depending portions 122 engageable with adjustment screws 123 threaded through a cross bar 124, the latter being fixed at its ends to the sides 102 of the main frame. Screws 123 have compression lock springs thereon to maintain them in any position of adjustment. The contact or amount of separation between protuberances 109 and the transfer roll 115 can be adjusted by manipulation of adjustment screws 123. Auxiliary frame 119 rests against the screws under the influence of gravity.

In order to pivot auxiliary frame 119 to separate the transfer roll and the path of travel of the faces of protuberances 109, there is provided a pair of cams 125 mounted on a shaft 126, which is journaled at its ends in sides 102 of the main frame 62. Shaft 126 is provided with a lever 127, compare Figs. 2 and 9, and by which the shaft can be rotated to cam the auxiliary frame in a counterclockwise direction, as the parts are depicted in Fig. 2, to move the transfer roll upwardly. Lever 127 carries a spring-pressed plunger 128 receivable within holes 129 formed in the work side of frame 62 for locking the cams in their inoperative positions as well as their operative positions (see Fig. 11).

Shaft 104 of the glue applicator cylinder 100 carries a small spur gear 140 (see Figs. 9 and 10) engaging the first of a pair of idler gears 141 and 142, supported from the gear side of frame 62. Idler gear 142 engages a spur gear 143 mounted on the shaft of transfer roll 115, the latter-named gear meshing with an idler gear 144 (see Fig. 10), which in turn meshes with a spur gear 145 on the shaft of dipping roll 116. The shaft of dipping roll 116 carries a second small spur gear 146 (see Fig. 10) which meshes with a relatively large spur gear 147 mounted on the shaft of the wiper roll 117. By the above-described gearing system the various rolls of the glue pot mechanism are rotatably driven.

The glue pot mechanism (see Fig. 2) includes a glue pot 150 in which dipping roll 116 dips, said glue pot having depending lugs 151 keyed to a shaft 152. Shaft 152 is fixed at its ends in the sides 102 of the main frame 62. There are a pair of thumb screws 153 threaded into lugs 151 and engageable with shaft 152 for holding the glue pot at a desired position along shaft 152.

For centering dipping roll 116, there is provided on the glue pot at each end thereof an abutment device, generally entitled 154. Devices 154 abut against the inner faces of the sides 118 of auxiliary frame 119 and against the outer faces of a pair of shields 155 (compare Figs. 2 and 9). Shields 155 are provided for partially shielding against outward throwing of glue at the left hand end of the glue pot, as the pot is depicted in Fig. 2, at which point agitation of the glue is at its maximum. The contact of devices 154 against sides 118 and shields 155 is such as to allow the auxiliary frame to be pivoted relative to these members, and yet the devices are disposed in closed contact with the sides 118 and shields 155 so as to satisfactorily center dipping roll 116.

As previously mentioned, the ends of the shafts for transfer roll 115 and the wiper roll 117 are journaled in the sides 118 of auxiliary frame 119. As best shown in Fig. 11, this journaling is accomplished by a pair of bushings 156 for each shaft, the shafts being mounted eccentrically in the bushings. Bushings 156 carry adjustment plates 157 which are adjustably secured to the sides 118 of the auxiliary frame 119 by screws 158, permitting the degree of contact between the wiper roll and the dipping roll, and the transfer roll and the dipping roll to be adjusted. Shields 155, previously mentioned, have clearance slots provided around the shaft for wiper roll 117 to permit such adjustment of the wiper roll.

Referring to Fig. 2, a splatter shield 160 is provided and fastened at its upper ends to bar 124 and has the remainder thereof arcuately bent and slotted to provide a plurality of fingers through the ends of which the protuberances 109 are adapted to pass. The upper portion of the shield serves to prevent glue, thrown off by the protuberances after their being coated by the transfer roll, from falling onto the sheets beneath the shield. Furthermore, the fingers serve the function of strippers in preventing any of the sheets from being lifted or following the protuberances on the glue applicator cylinder after the application of glue.

Between the forward ends of conveying belts 61, previously mentioned, and back-up roll 101, also previously mentioned, there is disposed a straddle plate 161 (see Fig. 5), having its opposite edges crenelated to closely fit the ends of conveying belts 61 and their pulleys 67, and raised portions 101a provided on roll 101. Straddle plate 161 is secured to the side frame members by depending supports 162, as shown in Fig. 9. Raised portions 101a are in lateral registry with protuberances 109 as clearly shown in Fig. 9.

Back-up roll 101 is supported at its ends by a pair of levers 165 (compare Figs. 2, 9, 10 and 12) which levers are pivoted at their right hand ends, as the parts are depicted in Fig. 2, about a pulley shaft 166, about which more is to be presently said. The free ends of the levers are pivotally connected to a pair of links 167 which in turn are adjustably pivotally connected to a pair of levers 168 fixed to a shaft 169 (see Fig. 9). Shaft 169 is journaled at its ends in the sides 102 of main frame 62. A single actuating lever 170 extends from and is fixed to shaft 169 (see Fig. 2) and carries on the free end thereof a cam follower roller 171 riding in the groove of a face cam 172 (see Figs. 2, 3 and 13). Cam 172 is mounted on a cam shaft 173, journaled in the sides of the main frame. Cam shaft 173 is adapted to be driven from shaft 104 of the glue applicator cylinder in a manner to be presently described so that back-up roll 101 is lowered in timed relation to operation of the glue applicator cylinder. Face cam 172 is so formed that back-up roll 101 is progressively lowered as a set of sheets is fed between the back-up roll and the glue applicator cylinder so as to compensate for the increased thickness of the set of sheets and therefore provide a uniform pressure between protuberances 109 and each sheet to thereby apply uniform adhesive spots to all sheets.

Back-up roll 101 is driven from the glue applicator cylinder 100, as best shown in Figs. 9, 10 and 12, by a spur gear 174 on pulley shaft 166. Gear 174 meshes with a large gear 175, fixed to shaft 104. Shaft 166 has a second gear 174a disposed adjacent the work side end thereof and meshes with an idler gear 176 carried on a depending lug on the work-side lever 165, which idler gear meshes with a spur gear 177 provided on roll 101.

Cam shaft 173, previously mentioned, is driven from gear 174 on pulley shaft 166 through an idler 178 (see Fig. 13) which idler engages a large spur gear 179 fixed to the gear-side end of cam shaft 173.

*Conveying mechanism E*

This conveying mechanism is inclined downwardly, as shown in Fig. 1, so that the force of gravity aids in the feeding operation.

Figure 3:
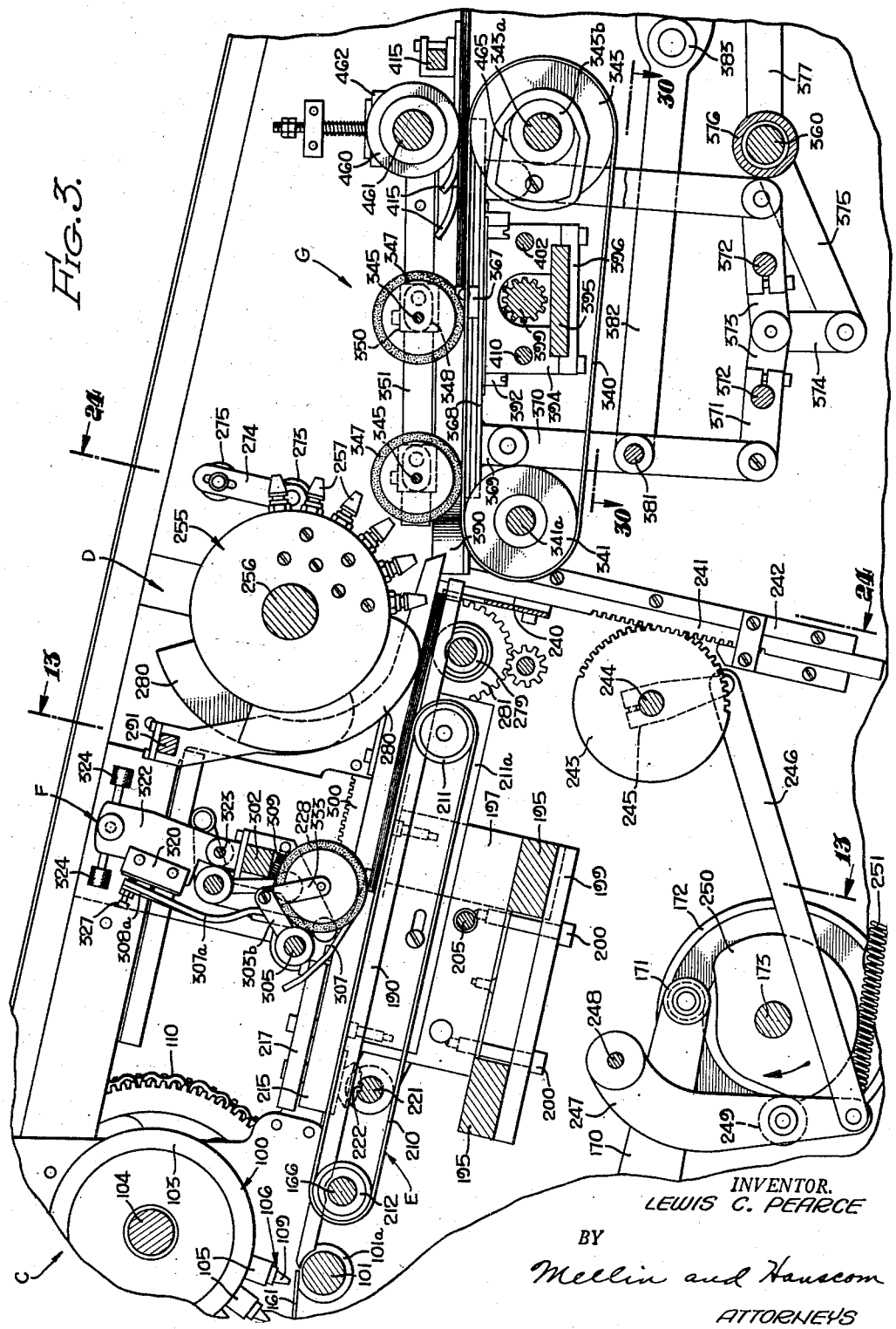
Fig. 3 is a view of a succeeding portion of the machine disclosed in Fig. 1 showing the feeler mechanism and the accumulator mechanism.
Figure 6:
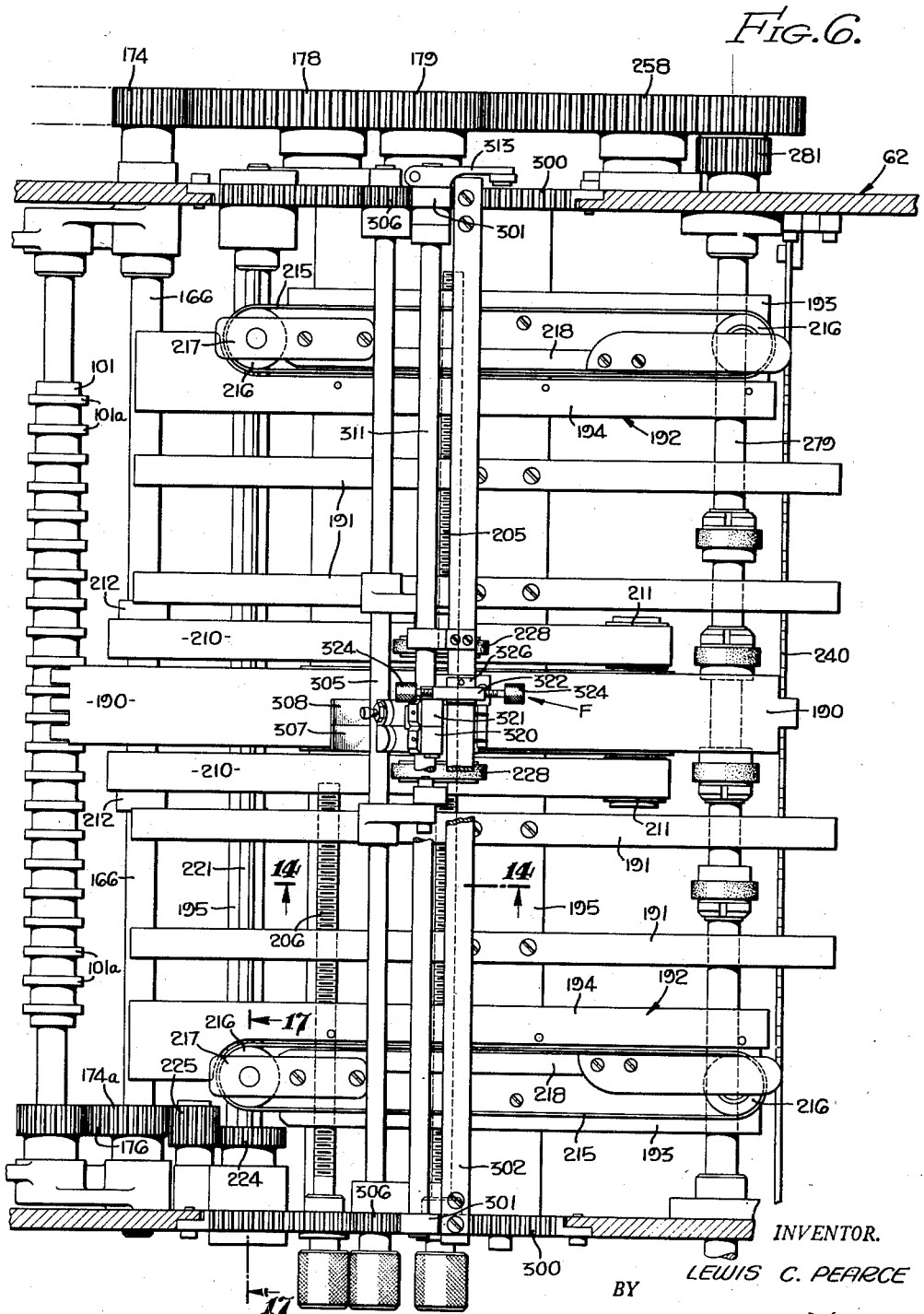
Fig. 6 is a plan view of the forward portion of the arrangement disclosed in Fig. 3 showing the feeler mechanism and the lower parts of the accumulator mechanism, the upper part of the accumulator mechanism being removed for convenience in illustration.

Referring particularly to Figs. 3, 6 and 13, conveying mechanism E comprises a single relatively wide central supporting strip 190 having its forward margin crenelated to closely fit the contour of back-up roll 101 (compare Figs. 3 and 6). At each side of central sheet supporting strip 190 are a pair of relatively narrow and relatively thin sheet supporting strips 191 (see Fig. 13), and on the outside of each of the outer relatively narrow strips 191 is a rather wide composite strip 192. Each composite strip 192 includes a lower relatively thick and wide strip 193 and an upper relatively thin sheet supporting strip 194, which is relatively narrow throughout the length thereof except at the forward portion thereof as shown in Fig. 6. Strips 194 are formed to conform to but being slightly spaced from the backs of a pair of side conveyor belts to be described hereinafter.

All the above-described strips are supported by a pair of cross bars 195 (see Fig. 3), which are secured at their ends to the sides 102 of the main frame 62. For supporting the strips from the bars there is provided a narrow block 197 for each of the narrow strips 191 (see Fig. 3), and a relatively wide block 198 for supporting the central relatively wide strip 190 and a wide block 198 for each of the composite strips 192. Each strip is fixedly secured to its block, and each of the blocks is adjustably fixed to bars 195 by means of a clamping plate 199 and clamping screws 200 (see Fig. 3). Central strip 190 and narrow strips 191 are adapted to be laterally adjusted by loosening their clamping plates and screws and manually moving the blocks which support the strips. It is apparent that more or less strips can be utilized depending on the width of the sheets to be accumulated.

Composite sheet supporting strips 192 are also adapted to be laterally adjusted by manipulation of a pair of adjustment screws 205 and 206 which are collared in sides 102 of the main frame as best shown in Figs. 6 and 13. Adjustment screw 205 extends through a clearance slot in block 198 for the work side composite sheet supporting strip 192, and further extends through a clearance slot in the supporting block for the main sheet supporting strip 190, and further threadedly extends into the block for the gear-side composite sheet supporting strip 192. The other adjustment screw 206 threadedly extends through the block for the work-side composite sheet supporting strip 192. The adjustment screws are adapted to be locked in any position of adjustment by conventional locking devices 207, best shown in Figs. 13 and 16. Side conveyor belts, to be presently described, are mounted on composite sheet supporting strips 192 and obviously are adapted to be laterally adjusted upon manipulation of the adjustment screws 205 and 206.

There are a pair of central conveyor belts 210 supported one on each side of the central sheet supporting strip 190 (see Fig. 6) for conveying sets of sheets forwardly toward the accumulating mechanism. These belts are rotatably supported by a pair of idler pulleys 211, supported by plates 211a, which are in turn supported from the central strip 190 (see Fig. 3), and by a pair of driven pulleys 212 mounted on shaft 166. Pulley shaft 166 has been previously referred to, and its drive from the glue applicator cylinder has likewise been described and, therefore, from the previous description it is obvious how the conveyor belts 210 are driven.

Referring now particularly to Figs. 6, 13, 17 and 18, the side conveying belts, each given the reference numeral 215, are each rotatably supported by a pair of pulleys 216. The shafts of the rear pulleys are journaled in strips 193, whereas the shafts of the forward pulleys are supported in cantilever fashion from strips 193 by means of hanger plates 217. Plates 217 are mounted on and spaced from plates 193 by upstanding back-up plates 218 provided on strips 193. The shafts of the forward pulleys have bevel gears 219 secured to the lower ends thereof. Bevel gears 219 are engageable with bevel gears 220 slidably but not rotatably mounted on a shaft 221, which has a keyway 222 extending substantially the full length thereof, said shaft being journaled at its ends in the sides 102 of the frame 62. Bevel gears 220 are moved with adjustment of the pulley assemblies by means of retainer blocks 223 secured to strips 193 (see Fig. 13). Referring to Fig. 6, it can be seen that shaft 221 carries a spur gear 224 which is driven through an idler gear 225 by spur gear 174a mounted on the pulley shaft 166, the drive of which has been previously explained.

A set of sheets leaving the glue applicator mechanism is fed forwardly by side conveying belts 215 and central conveying belts 210, the latter-named belts cooperating with a pair of idler rollers 228, supported from the feeler mechanism F and to be described more in detail hereinafter, against a stop 240 adapted to be interposed in the path of travel of each set of sheets to stop the lower-most sheet and provide an abutting surface against which the remaining sheets can be abutted. Side conveying belts 215 function to achieve not only forward movement of a set of sheets, but also a substanatial lateral registry of the sheets.

Stop 240 extends substantially the width of the machine as best shown in Fig. 6 and has a crenelated upper margin best shown in Fig. 24 to receive the ends of strips 190 and 191, and a set of stripper fingers to be described. For actuating stop 240, the stop is secured to a pair of racks 241 (see Fig. 3), slidably received within guides 242, secured to the sides 102 of the frame 62. Engaging each rack is a spur gear 243 (compare Figs. 3 and 24), which gears are secured to and adjacent the ends of a shaft 244. Shaft 244 is journaled at its ends in the sides 102 of main frame 62. Secured to shaft 244 is a single lever 245 which is connected by a link 246 to an actuating lever 247, pivoted at 248 to the work-side main frame 62 (compare Figs. 3 and 13). Lever 247 carries a cam follower roller 249 engaging a cam 250 fixed to cam shaft 173. A tension spring 251 maintains roller 249 in engagement with cam 250. The drive from pulley shaft 166 to cam shaft 173 has been previously described; therefore, the operation of stop 240 is in timed relation to operation of the glue applicator cylinder 100 so that stop 240 is interposed in the path of successive sets of sheets in timed relation to operation of the glue applicator mechanism C.

Fig. 27 shows the condition of the sheets during an accumulating operation which is to be presently described. The accumulator cylinder to be described operates so that the sheets of a set of sheets are brought against stop 240 and disposed in approximate longitudinal registry with each other (side belts 215 accounting for lateral registry), the accurately registering mechanism G to be described hereinafter, then operates on the sheets to accurately register the same.

Sheet accumulator mechanism

Above stop 240 is a rotary accumulator cylinder 255 fixed to a shaft 256 which is journaled at its ends in sides 102 of the main frame 62 (see Fig. 24). Cylinder 255 carries a plurality of rows of vacuum nozzles or heads 257, which rows are adapted to be successively connected to a source of vacuum, in a manner to be presently described, so that the rows pick up the penultimate sheet and then the above sheets in order to bring the sheets against stop 240 (see Fig. 27) to approximately longitudinally register the same. The action of the accumulator cylinder 255 and the side conveying belts 215 may be as such to exactly register the sheets in some cases, or only approximately register the sheets in other cases. Nozzles 257 are arranged out of alignment with protuberances 109 on cylinder 100 so that the nozzles contact the sheets at places out of registry with the glue spots on the sheets.

Shaft 256 is driven in timed relation to movement of conveying belts 210 and 215 so that pick-up nozzles 257 are in a position to adhere to the exposed forward margins of the sheets of each set of sheets, and in conjunction with the conveying belts to move the sheets forwardly, cylinder 255 being driven at the same speed as conveying belts 210 and 215. The drive to accumulator cylinder 255 is best shown in Figs. 6, 13 and 24 wherein it can be seen that there is an idler gear 258 journaled in the gear side of the main frame 62 and engaging with idler gear 178, which latter gear is driven by gear 174 on pulley shaft 166. Referring to Fig. 24, it can be seen that idler 258 drives a gear 259 mounted on the gear side of shaft 256.

Figure 28:
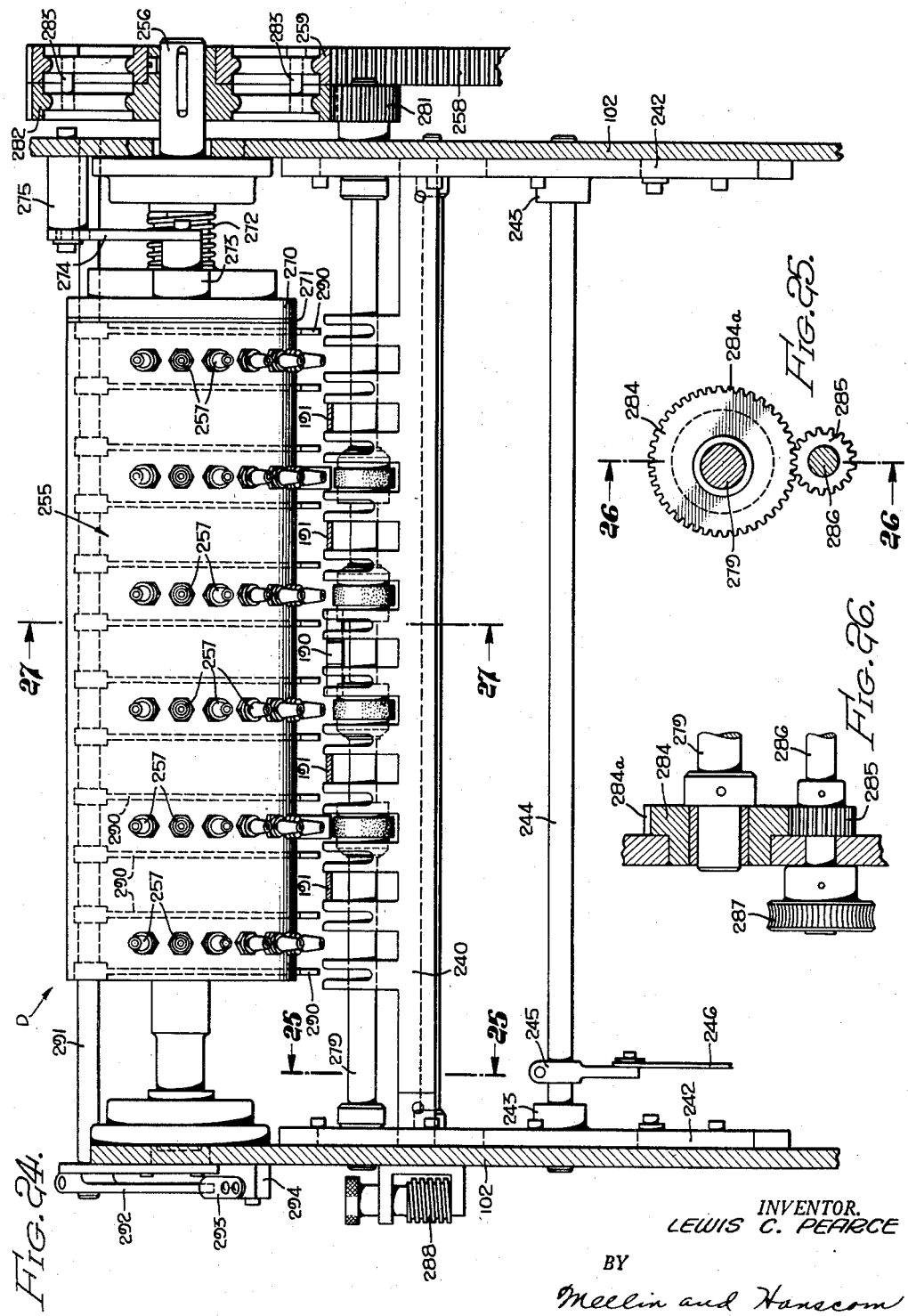
Fig. 28 is a sectional view taken along line 28—28 of Fig. 27 and further showing the internal construction of the accumulator cylinder.

There is a valve arrangement for successively connecting nozzles 257 with a source of vacuum, such arrangement being best shown in Figs. 24, 27 and 28. Viewing these figures, it can be seen that there is a stationary circular valve member 270 rotatably mounted on shaft 256 and held against a sealing disc 271, secured to the end of cylinder 255 by an expansion spring 272 surrounding shaft 256. Valve member 270 is held stationary by an arm 273 formed thereon, which arm is secured to a link 274 which is in turn adjustably secured to a post 275 secured to the gear side of the main frame 62 (compare Figs. 24 and 27).

Each row of nozzles 257 is provided with a passageway manifold 276, the manifolds being staggered as shown in Fig. 27 for purposes of ease in manufacture. Valve member 270 has two circumferentially elongated recesses 277 (compare Figs. 27 and 28) formed therein and communicating with a vacuum supply conduit 278. These recesses are adapted to register with manifolds 276 upon rotation of cylinder 255 to thereby connect the rows of nozzles in successive fashion to the source of vacuum to enable them to pick up and assist in moving the sheets forwardly against the stop 240. The picking-up operation is important for several reasons, among them being that if the sheets were merely shoved forwardly, the glue supply on the lower sheets, in each case, would be scrapped toward the stop, and furthermore, there would probably result a buckling in the edges of the sheets upon contact with the upwardly facing adhesive material on the next lower sheet.

Cam 250 is so formed that stop 240 is quickly projected or raised into the path of a set of sheets and thereafter is slowly lowered as the sheets are brought thereagainst to draw the edges of the sheets downwardly.

Beneath accumulating cylinder 255 there is a roll 279 adapted to cooperate with a plurality of nipper portions or segments 280 secured to or formed on accumulating cylinder 255 (see Fig. 27 and compare with Fig. 3). Roll 279 has a spur gear 281 on the gear end thereof (see Fig. 24) engaging a gear 282 rotatably mounted on shaft 256 for the accumulating cylinder and fastened to and secured to gear 259 by adjustment screws 283 to permit relatively rotative adjustment between gears 282 and 259 for a purpose to be presently described. During the accumulation of the sheets of a set of sheets, roll 279 merely frictionally rubs against the bottom surface of the lowermost sheet. However, upon the completion of an accumulating operation, the nipper portions 280 on the accumulating cylinder are brought around and coact with roll 279 to nip or apply a slight pressure to the accumulated sheets to feed the sheets toward the delivery end of the machine. Just before the nipper portions are brought around, stop 240 is lowered so that the approximately registered set of sheets can be fed toward the accurate registering mechanism G to be presently described.

As previously described, roll 279 is journaled at its ends in the sides 102 of the main frame 62. Referring to Figs. 3, 24, 25 and 26, this journaling takes the form of a bushing 284 at each end of the roll in which the roll is eccentrically mounted. Each bushing has spur gear teeth 284a formed thereon engaging a spur gear 285 mounted on a shaft 286. Shaft 286 is journaled at its ends in sides 102 of the main frame. The work-side end of shaft 286 carries a worm gear 287 engaging a worm 288 mounted on the work side of the main frame 62. Upon rotation of worm 288, bushings 284 are rotated to adjust the distance between the periphery of roll 279 and the peripheries of nipper portions 280 provided on accumulating cylinder 255. Since the above movement of shaft 286 will not be only up and down but somewhat longitudinal of the machine, a suitable rotative adjustment between gears 282 and 259 may have to be made and this can be accomplished by loosening adjustment screws 283 and rotating gear 282 relative to gear 259.

Referring to Figs. 3, 16 and 24, there is shown a combination stripper and jamb sensing arrangement including a plurality of stripper fingers 290 secured at their upper ends to a bar 291 which is rotatably mounted at its ends in the sides 102 of the main frame. Under the influence of gravity, fingers 290 are adapted to rest on sheets therebeneath. The ends of fingers 290 are adapted to fit between the crenelated portions of stop 240 (see Fig. 24). When a set of sheets is being accumulated, the stripper fingers will prevent pick-up or following movement of the sheets after a row of nozzles 257 has brought a particular sheet against stop 240. Of course, the vacuum is cut off from a particular row of nozzles when the row of nozzles has brought its sheet against the stop, but the stripper fingers prevent any pick-up which might accidentally occur because of the natural adhesion of the paper to the nozzles or because of the slight vacuum created by the movement of a row of nozzles away from a particular sheet.

Secured to the work-side end of bar 291 is an arm 292 normally spaced from an operating arm 293 of a microswitch 294 which is secured to the work side of the main frame 62 (see Fig. 16). Arm 292 will be spaced from the microswitch arm 293 even after a set of sheets has been fully accumulated. However, if a jam-up occurs, the stripper fingers will be shoved upwardly beyond their normal positions causing arm 292 to engage microswitch arm 293 to operate the microswitch 294 and stop the machine.

*Feeler mechanism*

Between the glue applicator mechanism C and the accumulator mechanism D is a feeler mechanism F. Feeler mechanism F is designed to be lowered onto a set of sheets after the sheets have been accumulated by the accumulator cylinder 255 to gauge the sheets and to stop the machine if there is a missing sheet or sheets or if there is an extra sheet or sheets. Fixed to each side of main frame 62 is a rack 300 (see Fig. 16), the functions of which will be presently described. Slidable along and partially under each rack is a supporting block or member 301. Supporting members or blocks are connected by a supporting bar 302 upon which the feeler mechanism proper is supported.

Figure 14:
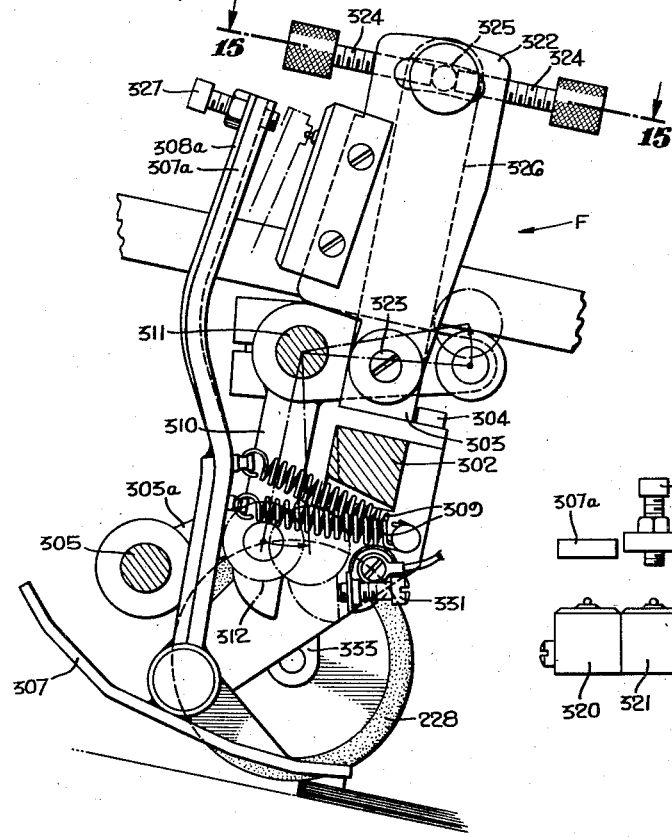
Fig. 14 is an enlarged view in side elevation taken along line 14—14 of Fig. 6 and showing the feeler mechanism.

The feeler mechanism proper is best shown in Fig. 14, and includes a frame 303 clamped to bar 302 by a suitable clamp 304, said frame having depending portions 303a extending therefrom to the left as the parts are depicted in Fig. 14 and through which rotatably extends a shaft 305 which carries a pair of spur gears 306, one adjacent either end thereof, disposed in engagement with the racks 300 (compare Figs. 14 and 16). Upon rotation of shaft 305 the feeler mechanism proper will be adjusted longitudinally of the machine.

Pivotally supported on frame 303 are a pair of feeler members 307 and 308 urged by a pair of tension springs 309, connecting the members to the frame 303, towards sheets passing beneath the feeler members. Normally restraining the feeler members against contact with a set of sheets passing therebeneath, is an arm 310 pivotally mounted on frame 303 on a shaft 311 which is journaled at its ends in traveling blocks 301. Arm 310 carries a roller 312 which engages both of the feeler members and prevents their engagement with a set of sheets therebeneath.

Referring to Figs. 13 and 19, it can be seen that the gear side end of shaft 311 has a lever 313 secured thereto spring urged upwardly into engagement with a bar 314 by a tension spring 315 connected to the gear side of main frame 62. Bar 314 is in turn secured to an actuating bar 316 guided for vertical movement by a pair of guide blocks 317 secured to the opposite sides of main frame 62 (compare Figs. 13 and 19). On its lower end, bar 316 carries a cam follower roller 318 engaging a cam 319 mounted on cam shaft 173 previously described.

From the above it is apparent that cam 319 is operated in timed relation to operation of the glue applicator mechanism and accumulator cylinder 255. Cam 319 is so designed that just after a set of sheets has been accumulated, the rise on cam 319 engages roller 318 raising bar 316 to move arm 310 in a counter-clockwise direction, as the parts are depicted in Fig. 14, to allow the feeler members 307 and 308 to engage the rear margin of the upper sheet of the registered sheets under the influence of tension springs 309.

Figure 15:
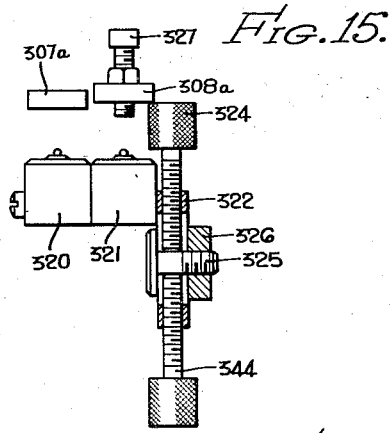
Fig. 15 is a horizontal sectional view taken along line 15—15 of Fig. 14.

Adapted to cooperate with upwardly extending portions 307a and 308a of feeler members 307 and 308 are a pair of microswitches 320 and 321 secured to an upwardly extending arm 322 pivoted at 323 on frame 303. Arm 322 is adapted to be adjusted so as to move the microswitches in unison toward or away from arm portions 307a and 308a by a pair of adjustment screws 324 threadedly received through upwardly extending forks of arm 322 and engaging a screw 325, the latter being threaded into a fixed arm 326 (compare Figs. 14 and 15) mounted on frame 303. Arm portion 308a of feeler member 308 carries a screw 327 having a lock nut to hold the screw in any position of adjustment. As is apparent from Figs. 14 and 15, the feeler members are adapted to engage their respective microswitches at different degrees of movement thereof so that feeler member 308 (by the medium of screw 327) is adapted to engage its microswitch 321 prior to the engagement of feeler member 307 with its microswitch 320.

Figure 20:
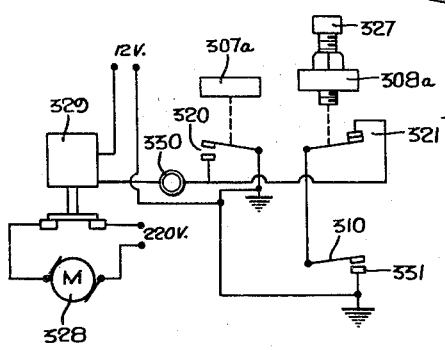
Fig. 20 is a wiring diagram of the feeler mechanism and showing the condition of the circuit prior to engagement of the feeler mechanism and a set of sheets.
Figure 21:
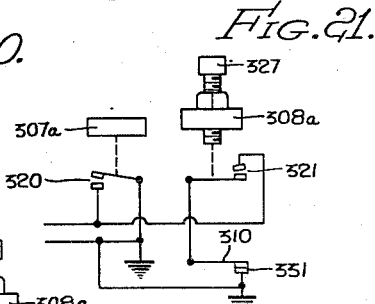
Fig. 21 is a view of a portion of the wiring diagram disclosed in Fig. 20, showing the condition of the circuit after the feeler mechanism has been lowered and has engaged a set of sheets of the correct thickness.

Figs. 20 through 23 show a circuit diagram including microswitches 320 and 321, a main drive motor 328 and a relay 329 for opening the motor circuit when the relay is energized. A signal light 330 is also provided. A third switch is provided comprising arm 310 and a fixed contact 331 (compare Figs. 14 and 20), which latter-named switch is adapted to be closed each time the arm 310 is actuated. Fig. 20 shows the circuit in the condition prior to release of feeler members 307 and 308. In Fig. 20 it can be seen that microswitch 321 for feeler member 308 is normally closed, whereas microswitch 320 for feeler member 307 is normally opened. When the accumulated set of sheets is of the right thickness, screw 327 will engage its microswitch to open the same as shown in Fig. 21, but feeler member 307 will not engage its microswitch 320, which will remain open. It is apparent from both Figs. 20 and 21 that relay 329 will not be grounded because in both cases the circuit through microswitch 321 and the third switch 331 is open.

Figure 22:
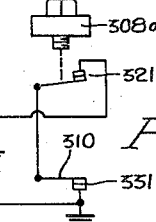
Fig. 22 is a view similar to Fig. 21 but showing the condition of the circuit when the feeler mechanism engages a set of sheets which is too thick, that is, in which there is an extra sheet or sheets.

Fig. 22 shows the circuit in the condition where the feeler members have contacted a set of sheets which are too thick. In such case, feeler member 308 is prevented from moving inwardly a sufficient distance to open normally closed microswitch 321 and therefore microswitch 321 remains closed, and since arm 310 contacts lower fixed contact 331, a circuit is completed through the fixed contact 331, arm 310 and microswitch 321 to ground relay 329 therefore energizing the relay and de-energizing the main motor 328.

Figure 23:
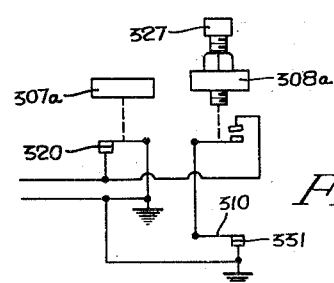
Fig. 23 is a view similar to Fig. 21 but showing the condition of the circuit when the feeler mechanism engages a set of sheets which is too thin, that is, where there is a missing sheet or sheets.

Fig. 23 illustrates the condition of the circuit when the feeler members have been lowered and have engaged a set of accumulated sheets which are too thin. Both feeler members engage their microswitches, feeler member 308 opening its microswitch 321 and feeler member 307 closing its microswitch 320, the latter closing operation serving to ground relay 329 and de-energizing motor 328.

Extending upwardly from portions 303a of frame 303 are a pair of arms 303b (see Fig. 3) having pivotally connected thereto a pair of links 333, said links carrying on the lower ends thereof rubber-covered rollers 228, previously described. These rollers are adapted to swing from the position shown in Fig. 3 downwardly under the influence of gravity, so as to engage a new set of sheets to ensure the feeding of the sheets toward the accumulator mechanism.

It is obvious that if sheets are accumulated having different lengths, that is, their dimensions longitudinal of the machine, the feeler mechanism can be longitudinally adjusted by rotation of shaft 305 so that the feeler members will, when lowered, engage the rear margin of the set of sheets.

The feeler members are allowed to remain in engagement with the rear ends of a set of sheets after the stop 240 is lowered and are raised just after the arcuate nipper portions 280 engage the set of sheets so that the registry of the sheets is maintained until engagement with the sheets by the nipper portions.

The accurate registering mechanism

Receiving the stacked sets of sheets from the accumulator mechanism is an accurate registering mechanism best shown in Figs. 3, 4, 7 and 29 through 35. The latter mechanism has a plurality of conveying belts 340 supported in part by pulleys 341 mounted on an idler shaft 341a, the latter being journaled in the sides 102 of the main frame 62. The delivery ends of the belts are supported by a set of pulleys 343, the shaft 343a of which is also journaled in the sides of the frame. The last-named shaft is adapted to be driven from the accumulator mechanism by a train of gears fragmentarily shown in Fig. 7 and labeled 344.

Above the belts there are a pair of shafts 345 (see Fig. 7), each carrying a pair of rubber-covered rollers 347 adapted to cooperate with the outside conveying belts for forward feeding of sheets. Each shaft is fixed at its ends to a pair of links 348 pivoted at 349 to clamps 350. Clamps 350 are clamped on tracks 351 secured to the sides of the main frame (compare Figs. 7 and 34). The longitudinal positions of the rollers can be adjusted by loosening clamps 350 and shifting them along tracks 351. The forwardmost (right hand) set of wheels are arranged to clear the rear margins of a set of sheets just prior to the accumulation operation.

Figure 4:
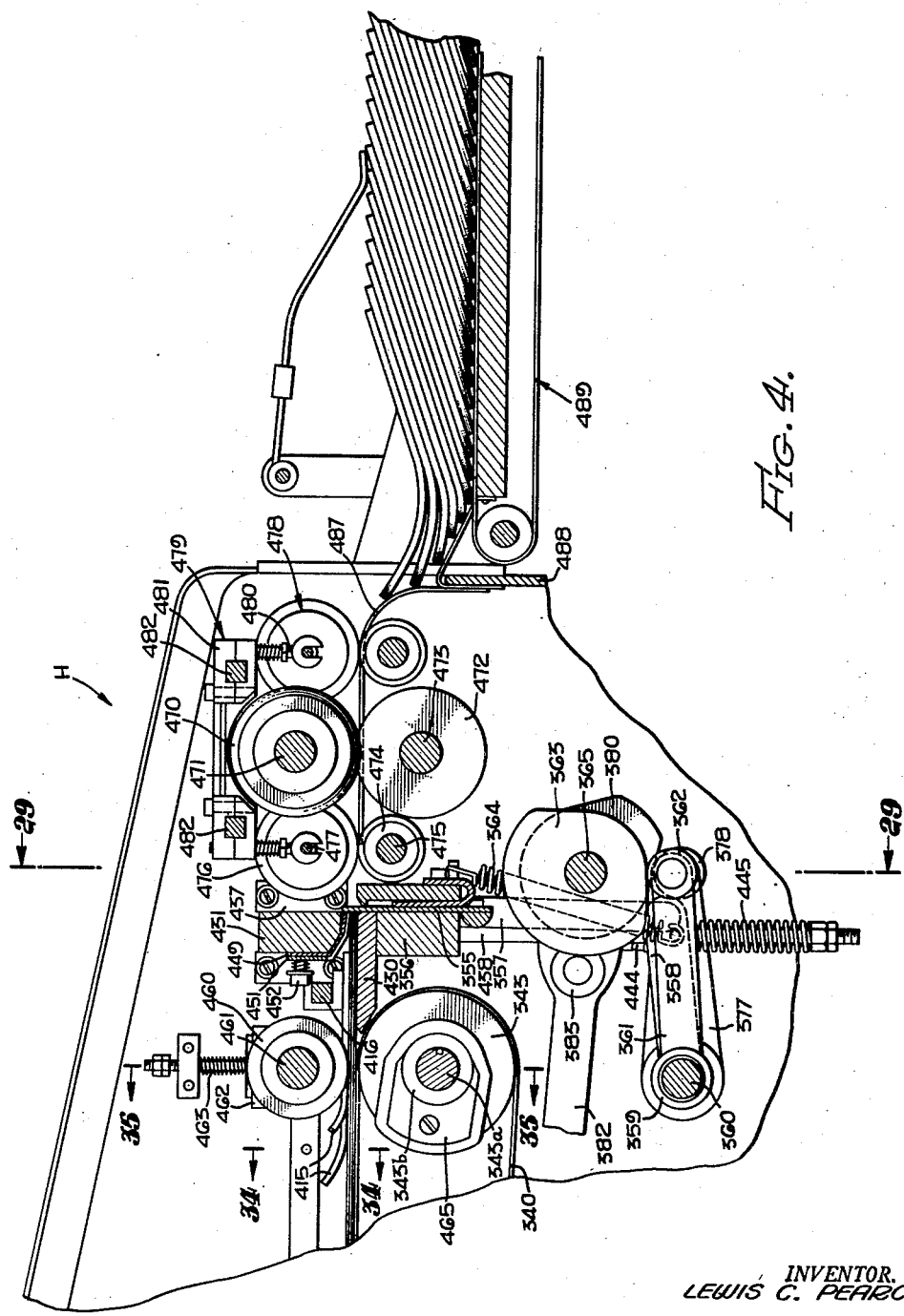
Fig. 4 is a further succeeding view in side elevation of the machine disclosed in Fig. 1 and particularly showing the slitting mechanism.

Adapted to be interposed in the path of travel of each set of sheets is a stop 355 (see Figs. 32 and 4). Stop 355 is slidably received within a guide 356 and spring pressed into engagement with the forward member of the guide. At its bottom margin, stop 355 is secured to a pair of laterally spaced links 357, which are, in turn, pivotally connected to a pair of levers 358, said levers being secured to a tubular shaft 359 rotatably mounted on a shaft 360, the latter being fixed at its ends to the sides of the main frame (see Fig. 30). For rocking tubular shaft 359, there is provided a lever 361 (see Fig. 30) fixed to tubular shaft 359 and carrying a follower roller 362, the latter being maintained in engagement with a cam 363 by a tension spring 364. Cam 363 is mounted on a cam shaft 365 journaled in the sides of the main frame (see Figs. 29 and 30). Cam shaft 365 is adapted to be driven from the accumulator mechanism by a gear train 366 (compare Figs. 7 and 29).

Figure 30:
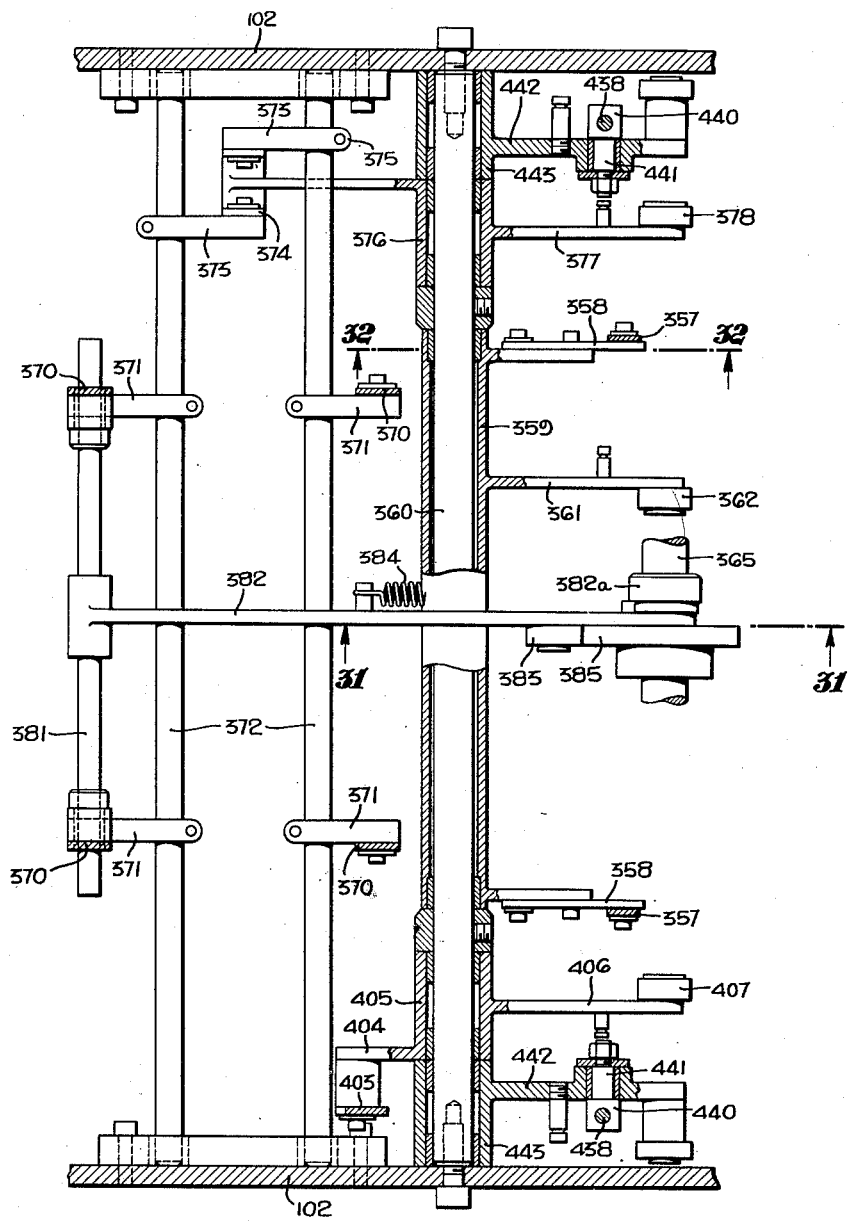
Fig. 30 is a horizontal sectional view taken along line 30—30 of Fig. 3 and showing part of the drive for the side kicking mechanism and the end kicking mechanism.

Levers 358 are extensible or contractible as shown in Figs. 30 and 32 to vary the amount and time of protrusion of stop 355 in front of the sets of sheets.

Operating in timed relation to operation of the above stop mechanism, is a kicker pad assembly best shown in Figs. 3, 4, 29, 30, 31, and 33. The kicker pad assembly includes a pair of laterally spaced kicker pads 367 (see Fig. 7) clamped to a pair of tracks 368 (see Fig. 33), and adapted to be adjusted therealong. The tracks have rigid depending lugs 369 (see Fig. 3) to which are pivotally secured the upper ends of a pair of links 370. The lower ends of links 370 are pivotally connected by links 371 to a pair of cross shafts 372, the latter being journaled at their ends in the sides of the main frame (see Fig. 30). Extending toward one another from shafts 372 are a pair of tie links 373 secured to shafts 372 and pivotally connected to a depending link 374 which, in turn, is pivotally connected to a lever 375 secured to a tubular shaft 376, the latter being rotatably mounted on shaft 360 (see Fig. 30). Fixed to tubular shaft 376 is a lever 377 carrying a cam follower roller 378, which is spring urged by a spring 379 into engagement with a cam 380 (see Fig. 29), said cam being secured to cam shaft 365. Upon rotation of cam 380 kicker pads 367 are reciprocated vertically through the links and levers above-described.

For reciprocating the kicker pads horizontally, there is provided a single rod or bar 381 pivoted to each of the forward links of links 370 and carrying a lever 382 fixed thereto. Lever 382 has its opposite end bifurcated as shown in Fig. 31 to fit over a guide block 382a, rotatably mounted on cam shaft 365, to be guided thereby. Lever 382 carries a cam follower roller 383 (compare Figs. 31 and 30) spring urged by a spring 384 into engagement with a cam 385, said cam being secured to shaft 365. The timing of cams 385 and 380 is such that the kicker pads, upon rotation of cam shaft 365, will be lowered from the raised positions shown in Fig. 3, then moved to the left as the parts are depicted in Fig. 3, and after a succeeding set of sheets passes thereby, will be raised and then advanced toward the delivery end of the machine to engage the rear edges of the stack of sheets and push or kick the sheets against stop 355 to accurately register the sheets in a direction longitudinal of the machine.

Figure 7:
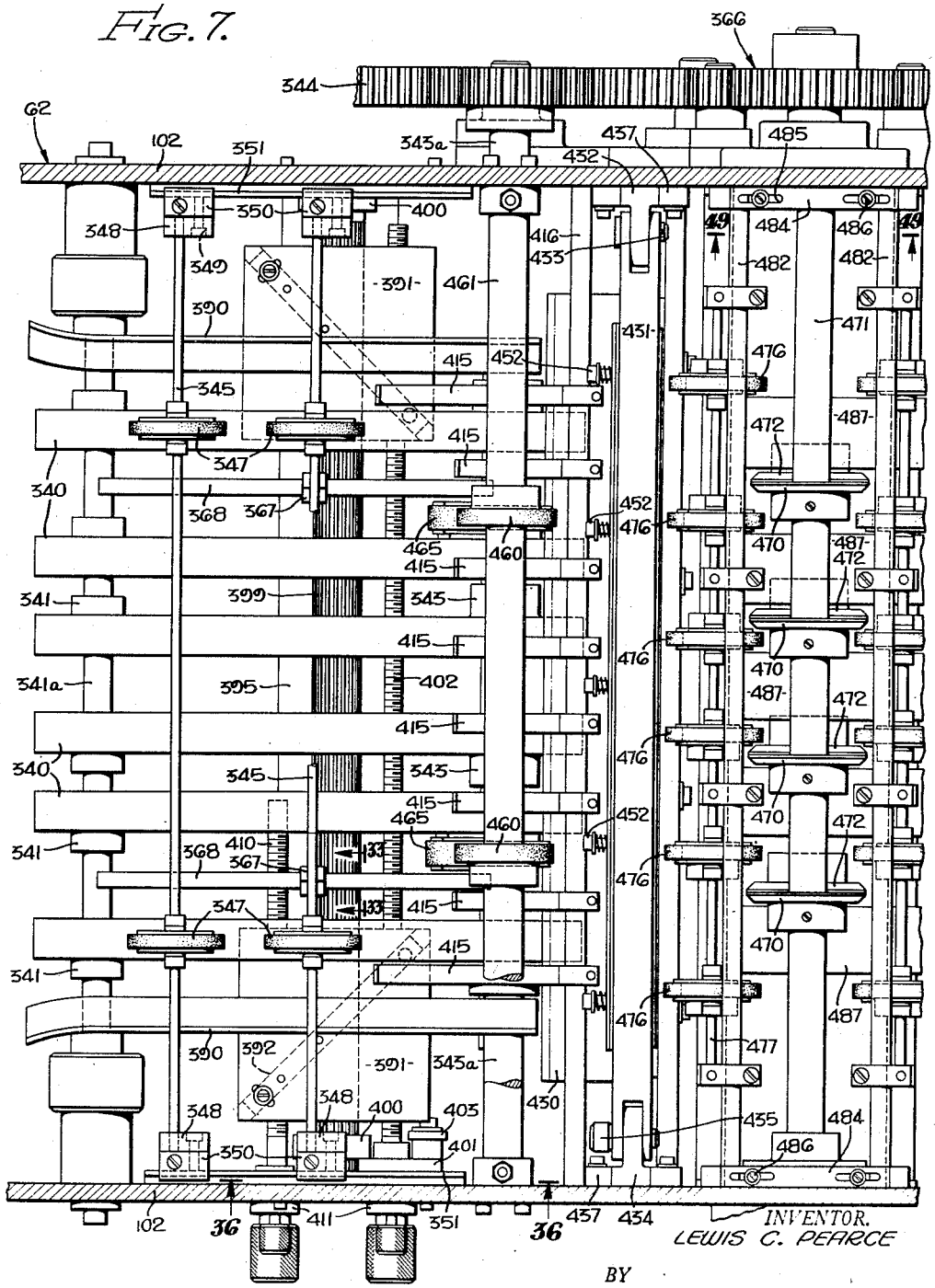
Fig. 7 is a plan view of the mechanism for accurately registering the sets of sheets of paper and also showing a portion of the slitting mechanism, which above-described mechanisms are disclosed in side elevation at the rearward end of Fig. 3 and the forward end of Fig. 4.

The accurate sheet registering mechanism includes a side jogger or kicker assembly comprising a pair of laterally spaced angle members 390 (see Figs. 7, 30 and 36 through 39), each of which members is rigidly secured to a plate 391. The forward ends of angle members 390 diverge as shown in Fig. 7 to assure the ready reception of sets of sheets. Plates 391 are reciprocably mounted for converging diagonal movement relative to the frame of the machine, as shown in Fig. 7, by being fastened to upwardly protruding lugs 392a on a pair of racks 392. The racks are slidably received within guide grooves 393 formed in guide blocks 394, the latter being mounted on a cross beam or bar 395 (see Fig. 38). There are clamp plates 396 and bolts for adjustably fixing the blocks to the beam permitting adjustment of the blocks laterally of the frame and, therefore, adjustment of angle members 390 to compensate for different size sheets. The ends of the beam are fixed to the sides of the frame as shown in Fig. 39.

As is apparent from Fig. 37, there are rack retainer plates 397 secured to the guide blocks and having diagonally inwardly extending slots 398 to accommodate the upward protruding lugs 392a of the racks 392.

Racks 392 are adapted to be reciprocated by a shaft gear 399 having gear teeth cut the full length thereof, which shaft gear extends through clearance holes provided in blocks 394 and is supported at its ends by bearings 400, the latter being mounted on beam 395 (see Fig. 39). Racks 392 have diagonal teeth formed therein so as to properly mesh with the gear teeth on the shaft gear 399.

Shaft gear 399 is actuated by a link 401 pivoted on an adjustment shaft 402, to be described hereinafter more in detail, and having gear teeth formed on the end thereof adjacent the shaft gear 399 so as to mesh with the teeth on said shaft gear (see Fig. 36). Link 401 is adapted to be actuated by a link 403 pivotally connected to a lever 404, said lever being fastened to a tubular shaft 405, rotatably mounted on shaft 360, previously referred to. Fixed to and extending from the opposite side of tubular shaft 405 is an actuating lever 406 carrying a follower roller 407, which is spring urged into engagement with a cam 408 by a tension spring 409. Cam 408 is affixed to the main cam shaft 365.

From the above it is apparent that upon rotation of cam 408, the racks will be driven inwardly rather quickly to a position where the opposite angle members 390 are substantially the same distance apart as the width of the sheets of the set of sheets so as to accurately register the sheets of each set in a direction transverse of the machine and to also shove the sheets against stop 355 to assist in longitudinal registry.

Angle members 390 are adapted to be adjusted away or toward one another by means of a pair of adjustment screws 410 and 402, the latter screw being heretofore mentioned. Screw 410, as best shown in Figs. 7 and 36, is threaded into the guide block for the work side angle member, whereas, the adjustment screw 402 is received through a clearance slot in the just-mentioned block and is threadedly received by the gear-side guide block. Whenever the clamping plates 396 are relieved, the blocks can be adjusted by manipulation of the adjustment screws. The adjustment screws are held in their adjusted positions by a conventional locking arrangement 411 (see Figs. 7 and 16).

Referring to Figs. 3 and 7 there is shown a plurality of hold-down fingers 415 having their left-hand ends, as the parts are depicted in Fig. 3, upwardly turned. These fingers are mounted on a cross bar 416 secured at its ends to the sides 102 of the main frame 62. As sets of sheets of paper are fed under the hold-down fingers, they are retained in a held-down condition by the fingers.

Referring to Figs. 4 and 7 there is shown an anvil plate or member 430 secured to guide 356 for stop 355, which anvil member supports the sheets of paper adjacent stop 355.

Above anvil member 430, there is a pressure bar assembly including a pressure bar 431 pivoted (see Figs. 42 through 46) at its right-hand end, as the parts are depicted in Fig. 7, to a slide 432 by a pivot pin 433, and connected at its opposite end as shown in Fig. 42 to a second slide 434 by a removable pin 435, the latter being releasably held in place by a spring pressed detent 436. Slides 432 and 434 are guided for vertical movement by guides 437 secured to the sides of the main frame.

Pressure bar 431 is adapted to be vertically reciprocated by a pair of rods 438 (see Figs. 40 and 41) fixed at their upper ends to slides 432 and 434 and guided for vertical movement by guides 439 fixed to the sides 102 of main frame 62. Each of the rods 438 slidably carries a sleeve 440 pivoted at 441 to a lever 442, there being one lever for each rod. Levers 442 are secured to tubular shafts 443 mounted on shaft 360, previously mentioned (see Fig. 30). Sleeves 440 are limited in their upward movement by check nuts 444 on each rod, as shown in Fig. 4 for one rod, said sleeves being spring urged upwardly by compression springs 445 provided on the rods. Levers 442 are spring urged upwardly by tension springs 446 connecting the levers to the sides of the main frame and maintaining follower rollers 447 against cams 448 which are mounted on cam shaft 365, previously mentioned, see Fig. 29.

The timing of cams 448 is such that just as stop 355 descends, pressure bar 431 is forced downwardly, by sleeves 441 compressing springs 445, toward the right-hand margin of the upper sheet as clearly shown in Fig. 4.

Referring to Figs. 43 through 49, there is shown mounted on bar 431 a main pressure plate 449 having a slotted lower margin as shown in Fig. 44 to accommodate the fingers 450 of a stripper plate 451, the latter fitting onto the back of the main pressure plate. Pressure plate 449 and stripper plate 451 are mounted on the pressure bar by means of a plurality of bolts 452 receivable through ovate clearance slots 453 and 454 (compare Figs.

47 and 48) formed in the plates 449 and 451, respectively. Pressure plate 449 is urged to remain in the position shown in Fig. 43 by a plurality of compression springs 455, and stripper plate 451 is urged to remain in its position as shown in Fig. 43 by a plurality of springs 456, there being one compression spring 455 for each bolt, and one compression spring 456 for each bolt. The lower margins of the plates diverge from the bottom of bar 431.

Upon lowering of bar 431, the stripper fingers 450 first engage the right-hand edge of the stack of sheets, and are pivoted in a counterclockwise direction about edges 457 of pressure plate 449. This pivoting action of stripper plate 451 and stripper fingers 450 will proceed until fingers 450 are approximately registered with the lower ends of pressure plate 449, as shown in Fig. 45. At this time, both the stripper plate and the pressure plate will be further pivoted to the position shown in Fig. 46 to thereby apply pressure first to the extreme outer edge of the right-hand margin of the stack of sheets as the parts are depicted in Figs. 45 and 46, and then progressively apply pressure inwardly from the right-hand edge. This action serves to prevent the adhesive material from being squeezed out of the right-hand edges of the stack of sheets and thereby avoiding the difficulties inherent in handling stacks or sets of sheets having exposed adhesive material.

Ovate clearance slots 453 and 454, previously described, allow the pivoting movement of pressure plate 449 and stripper plate 451 relative to the bolts 452 and yet maintain engagement between compression springs 455 and 456 and pressure plate 449 and stripper plate 451, respectively.

Thereafter, upon ascending movement of bar 431, pressure plate 449 and stripper plate 451 will pivot in a clockwise direction with the stripper plate moving out of lateral registry with the pressure plate to the position shown in Fig. 43 to thereby strip the stack of sheets from the pressure plate if there is any adherence between the stack of sheets and the pressure plate.

It is apparent that plates 449 and 451 can apply even pressure across a set of sheets even though the set is of uneven height such as would result if there were pre-attached carbon sheets in a set.

Figure 29:
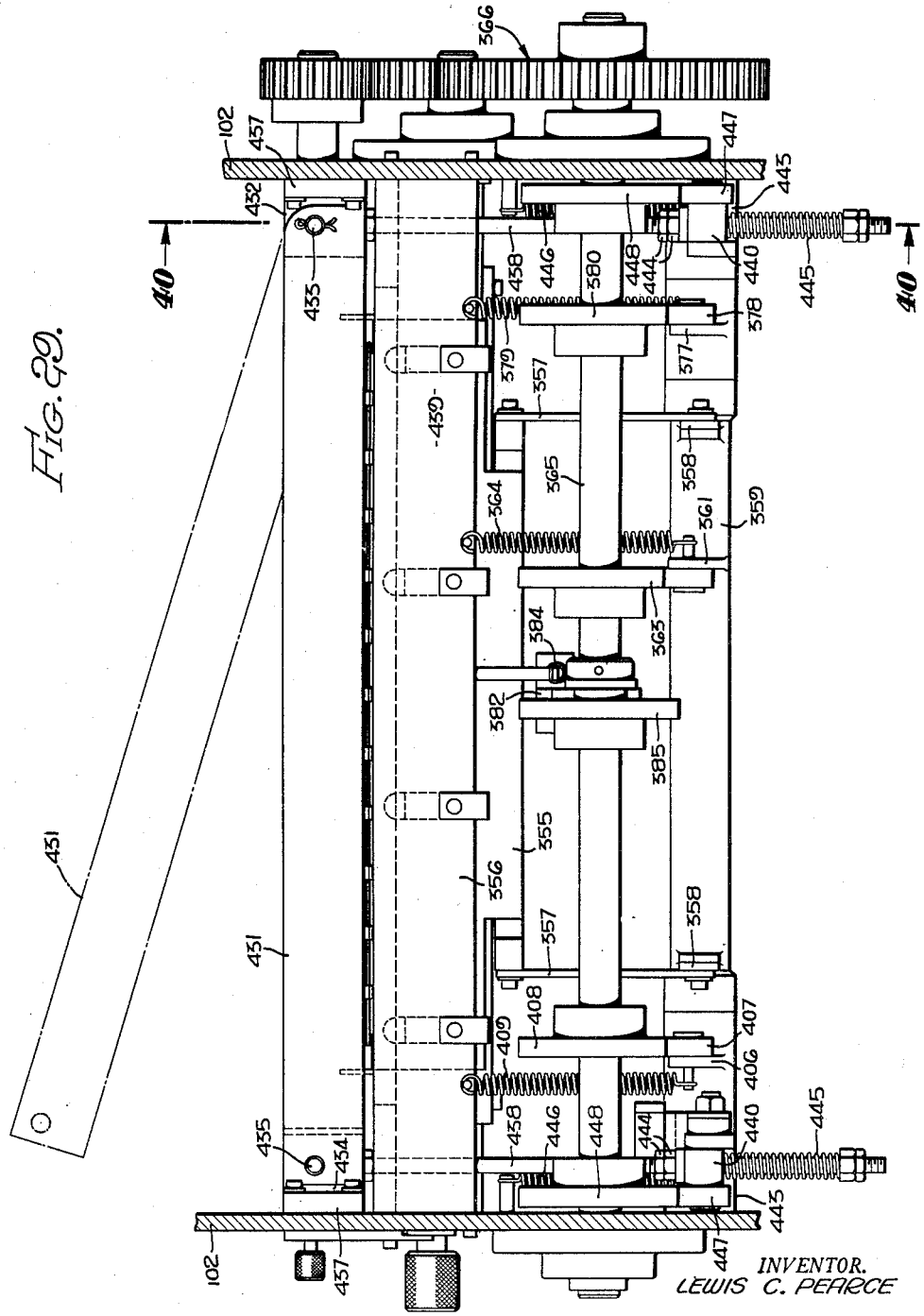
Fig. 29 is a vertical transverse sectional view taken along line 29—29 of Fig. 4, showing a part of the mechanism for pressing the sheets of a set of sheets together.

If there is a need to remove adhesive material from the plates, or if there is a jam up at the pressure bar assembly, or if it is desired to inspect or remove a set of sheets, pin 435 can be removed and pressure bar 431 swung upwardly from the full line position shown in Fig. 29 to the dot-dash line position.

Referring to Figs. 4, 7 and 35, there is shown a pair of rollers 460 mounted on a shaft 461, which shaft is floatingly journaled in the main frame. As shown in Fig. 35, each end of the shaft is journaled in a bearing 462 slidably mounted within a slot provided within the associated side of the main frame. The bearings are urged downwardly by compression springs 463 carried by the sides of the main frame. Shaft 461 is driven by gear train 344 (see Fig. 7) in the proper direction, shaft 461 carrying a spur gear 464 by which it is driven. The amount of bodily movement of shaft 461 is not sufficiently great to substantially impair the drive to gear 464.

Beneath rollers 460 are a pair of rubber-covered advancing or feeding segments 465 mounted on the hubs 343b of the central set of pulleys 343, previously referred to. Shaft 343a, on which pulleys 343 are mounted, is so driven from gear train 344 that after pressure bar 341 has ascended, segments 465 move around beneath rollers 460 and, therefore, gently nip the stack of sheets at the accurate registering station to advance these sheets toward the slitting mechanism H.

*Slitting mechanism*

Referring to Figs. 4, 7 and 49, there is disclosed a slitting mechanism including a set of upper slitting wheels 470 mounted on a shaft 471, the latter being journaled at its ends in the sides of the main frame, and a set of lower slitting wheels 472 mounted on a shaft 473, which is also journaled at its ends at the sides of the main frame. As shown in Fig. 4, upper wheels 470 slightly overlap the lower wheels 472 to provide a cutting arrangement. Rearwardly (to the left) of the cutting wheels is a lower set of feed rollers 474 mounted on a shaft 475, journaled in the sides of the main frame, and an upper set of feed rollers 476 mounted on a shaft 477 which is removably supported in U-shaped bearings 477a (see Fig. 49). There is a second feed roller unit 478 disposed on the delivery side of the slitting wheels and being similar in construction and mounting to the first-described unit.

The upper feed rollers of each unit are maintained in engagement with their lower feed rollers by a removable yoke generally entitled 479 carrying a set of plungers 480 spring urged downwardly and having their lower ends bifurcated to fit onto the shafts for the upper feed rollers. Plungers 480 are slidably received within clamps 481 clamped onto bars 482. Bars 482 are supported at their ends in brackets 483 secured to the sides of the main frame (see Fig. 49) and are removably retained in their brackets by keepers 484 (compare Figs. 7 and 49). Keepers 484 have elongated slots 485 formed therein receiving screws 486 threaded into brackets 483 and surrounded by springs 486a. Bars 482 can be removed by shifting keepers 484 in one direction to release one bar, and then in the opposite direction to release the other bar, thereby enabling the removal of yoke 479. Thereafter the upper feed rolls can be removed to inspect or remove a stack of sheets in the slitting mechanism.

There is preferably provided a plurality of fixed supporting plates 487 (compare Figs. 4 and 7) for supporting a stack of sheets during their passage through the slitting mechanism. The supporting plates are fixed to a cross member 488 secured to the sides of the frame.

Adapted to receive the slitted sets of sheets is a slow moving creeper conveyor generally entitled 489 (see Fig. 4).

The operation of the overall machine and the operation of the separate units thereof have been described during the above description and need not now be repeated.

It is pointed out, however, that the overall machine and the individual components or units thereof have been designed whereby different size sheets can readily be accommodated in the machine with a few adjustments with certain parts thereof. Furthermore, different thicknesses of sheets can be readily accommodated and sheets having carbon applied thereto can be readily handled without smearing of the carbon or producing pressure marks on the sheets.

By the present invention, a machine has been provided wherein sets of sheets initially arranged in spread, fanned or shingled fashion can have adhesive material applied to the exposed portions thereof and thereafter the sets of sheets can be accumulated so that the sheets of each set are registered with one another. Furthermore, the overall accumulating arrangement includes an accumulator cylinder which functions to approximately or substantially register the sheets with one another and thereafter the sheets are accurately registered with one another, if they are not already in that condition, by the accurate sheet registering mechanism G. Thereafter, the sheets may be slit if desired, although the slitting step may be eliminated. A gauging or feeling mechanism has been provided which will gauge the sheets so as to stop the machine in case a set of sheets is fed therethrough having a greater or lesser number of sheets than desired. The margins of sheets having the adhesive material applied thereto are pressed together by a pressure bar assembly so operating that the margins of the sheets are pressed from the edges thereof inwardly so that the adhesive material is contained within the sheets and not squeezed out to the edges of the sheets where the adhesive material could contact and be deposited on the parts of the machine with the obvious resulting disadvantages to operation of the machine.

While I have shown the preferred form of my invention, it is to be understood that various changes may be made in its construction by those skilled in the art without departing from the spirit as defined in the appended claims.

Having thus described my invention, what I desire to claim and secure by Letters Patent is:

1. A machine of the class described for operating on a spread set of sheets, comprising means for receiving and applying an adhesive material to exposed portions of a spread set of sheets, means operable in timed relation to operation of the last-named means for receiving the treated set of sheets from the last-named means and arranging them in registered fashion, and means operable to press the treated portions of the sheets together.

2. A machine of the class described for operating on a spread set of sheets, comprising means for receiving and applying an adhesive material to exposed portions of a spread set of sheets, means operable in timed relation to operation of the last-named means for receiving the treated set of sheets from the last-named means and arranging them in registered fashion, and means operable to press the treated portions of the sheets together, and means operable in timed relation to operation of the third-named means for receiving a set of sheets from the third-named means slitting the same into several portions.

3. A machine of the class described for operating on a spread set of sheets, comprising means for receiving and applying an adhesive material to exposed portions of a spread set of sheets, means operable in timed relation to operation of the last-named means for receiving the treated set of sheets from the last-named means and arranging them in registered fashion, and means operable to press the treated portions of the sheets together, and means for gauging the thickness of the registered sheets and for stopping operation of the machine if the number of sheets is more or less than a desired number of sheets.

4. A machine of the class described for operating on a spread set of sheets, comprising means for receiving and applying an adhesive material to exposed portions of a spread set of sheets, means operable in timed relation to operation of the last-named means for receiving the treated set of sheets from the last-named means and arranging them in registered fashion, means operable to press the treated portions of the sheets together, means operable in timed relation to operation of the third-named means for receiving a set of sheets from the third-named means and slitting the same into several portions, and means for gauging the thickness of the registered sheets and for stopping operation of the machine if the number of sheets is more or less than a desired number of sheets.

5. A machine of the class described for operating on a spread set of sheets, comprising means for receiving and applying an adhesive material to exposed portions of a spread set of sheets, means operable in timed relation to operation of the last-named means for receiving the treated set of sheets from the last-named means and arranging them in registered fashion, means operable to press the treated portions of the sheets together, the first-named means including a pair of opposed rotary members, one rotary member being a glue applicator and the other member being a back-up roll, and a mechanism for progressively separating the rotary members as the set of sheets pass therebetween.

6. A machine of the class described for operating on a spread set of sheets, comprising means for receiving and applying an adhesive material to exposed portions of a spread set of sheets, means operable in timed relation to operation of the last-named means and arranging them in registered fashion, means operable to press the treated portions of the sheets together, the first-named means including a pair of opposed rotary members, one rotary member being a glue applicator and the other member being a back-up roll, a mechanism for progressively separating the rotary members as the set of sheets pass therebetween, and means operable in timed relation to operation of the third-named means for receiving the sheets from the third-named means and slitting the same into several portions.

7. A machine of the class described for operating on a spread set of sheets, comprising means for receiving and applying an adhesive material to exposed portions of a spread set of sheets, means operable in timed relation to operation of the last-named means for receiving the treated set of sheets from the last-named means and arranging them in registered fashion, means operable to press the treated portions of the sheets together, the first-named means including a pair of opposed rotary members, one rotary member being a glue applicator and the other member being a back-up roll, a mechanism for progressively separating the rotary members as the set of sheets pass therebetween, and means operable in timed relation to operation of the second-named means for gauging the thickness of the registered sheets and for stopping operation of the machine if the number of sheets is either more or less than a desired number of sheets.

8. A machine of the class described for operating on a spread set of sheets, comprising means for receiving and applying an adhesive material to exposed portions of a spread set of sheets, means operable in timed relation to operation of the last-named means for receiving the treated set of sheets from the last-named means and arranging them in registered fashion, means operable to press the treated portions of the sheets together, the second-named means including a rotary member having a plurality of suction nozzles operable to successively pick up and arrange the upper sheets in registered relation with respect to the bottom sheet.

9. A machine of the class described for operating on a spread set of sheets, comprising means for receiving and applying an adhesive material to exposed portions of a spread set of sheets, means operable in timed relation to operation of the last-named means for receiving the treated set of sheets from the last-named means and arranging them in registered fashion, and means operable to press the treated portions of the sheets together, the second-named means including a rotary member having a plurality of suction nozzles operable to successively pick up and arrange the upper sheets in registered relation with respect to the bottom sheet, a stop and a mechanism operable to interpose the stop in the line of travel of a set of sheets to allow the sheets to be abutted against the stop for registering purposes.

10. A machine of the class described for operating on a spread set of sheets, comprising means for receiving and applying an adhesive material to exposed portions of a spread set of sheets, means operable in timed relation to operation of the last-named means for receiving the treated set of sheets from the last-named means and arranging them in registered fashion, means operable to press the treated portions of the sheets together, the first-named means including a pair of opposed rotary members, one rotary member being a glue applicator and the other member a back-up roll, and a mechanism for separating the rotary members as the set of sheets passes therebetween, the second-named means including a rotary member having at least one suction nozzle for each sheet of a set of sheets except for the bottom-most sheet and being operable to successively pick up and place the upper sheets in registered relation onto the bottom sheet.

11. A machine of the class described for operating on a spread set of sheets, comprising means for receiving and applying an adhesive material to exposed portions of a spread set of sheets, means operable in timed relation to operation of the last-named means for receiving the treated set of sheets from the last-named means and arranging them in registered fashion, means operable to press the treated portions of the sheets together, the first-named means including a pair of opposed rotary members, one rotary member being a glue applicator and the other member a back-up roll, and a mechanism for separating the rotary members as the set of sheets passes therebetween, the second-named means including a rotary member having at least one suction nozzle for each sheet of a set of sheets except for the bottom-most sheet and being operable to successively pick up and place the upper sheets in registered relation onto the bottom sheet, a stop and a mechanism operable to interpose the stop in the line of travel of a set of sheets to allow the sheets to be abutted against the stop for registering purposes.

12. A machine of the class described for operating on a spread set of sheets, comprising means for receiving and applying an adhesive material to exposed portions of the spread set of sheets, means operable in timed relation to operation of the last-named means for receiving a set of sheets from the last-named means and arranging the sheets in an approximately registered condition, and means operable in timed relation to the second-named means for receiving a set of sheets from the second-named means and kicking or jogging the sheets both at the sides and at the ends thereof for accurately registering the same.

13. A machine of the class described for operating on a spread set of sheets, comprising means for receiving and applying an adhesive material to exposed portions of the spread set of sheets, said means including a pair of opposed rotary members, one rotary member being a glue applicator and the other member being a back-up roll, and a mechanism for separating the rotary members as the set of sheets passes therebetween, means operable in timed relation to operation of the last-named means for receiving a set of sheets from the last-named means and arranging the sheets in an approximately registered condition, and means operable in timed relation to operation of the second-named means for receiving a set of sheets from the second-named means and kicking or jogging the sheets both at the sides and ends for accurately registering the same.

14. A machine of the class described for operating on a spread set of sheets, comprising means for receiving and applying an adhesive material to exposed portions of the spread set of sheets, said means including a pair of opposed rotary members, one rotary member being a glue applicator and the other member being a back-up roll, and a mechanism for separating the rotary members as the set of sheets passes therebetween, means operable in timed relation to operation of the last-named means for receiving a set of sheets from the last-named means and arranging the sheets in an approximately registered condition, the second-named means including a rotary member having at least one suction nozzle for each sheet of the set of sheets except for the bottom sheet and being operable to successively pick up and place the upper sheets in registered relation onto the bottom sheet, and means operable in timed relation to the second-named means for receiving a set of sheets from the second-named means and kicking or jogging the sheets both at the sides and ends thereof to accurately register the same.

15. A machine of the class described for operating on a spread set of sheets, comprising means for receiving and applying an adhesive material to exposed portions of the spread set of sheets, means operable in timed relation to operation of the last-named means for receiving a set of sheets from the last-named means and arranging the sheets in an approximately registered condition, means operable in timed relation to the operation of the second-named means for receiving a set of sheets from the second-named means and kicking or jogging the sheets both at the sides and at the ends thereof for accurately registering the same, and means operable in timed relation to operation of the second-named means for gauging the thickness of the registered sheets for stopping operation of the machine if the number of the sheets is more or less than the desired number of sheets.

16. A machine of the class described for operating on a spread set of sheets, comprising means for receiving and applying an adhesive material to exposed portions of the spread set of sheets, said means including a pair of opposed rotary members, one rotary member being a glue applicator and the other member being a back-up roll, and a mechanism for separating the rotary members as the set of sheets passes therebetween, means operable in timed relation to operation of the last-named means for receiving a set of sheets from the last-named means and arranging the sheets in an approximately registered condition, and means operable in timed relation to operation of the second-named means for receiving a set of sheets from the second-named means and kicking or jogging the sheets both at the sides and ends for accurately registering the same, and means operable in timed relation to operation of the second-named means for gauging the thickness of the registered sheets for stopping operation of the machine if the number of the sheets is more or less than the desired number of sheets.

17. A machine of the class described for operating on a spread set of sheets, comprising means for receiving and applying an adhesive material to exposed portions of the spread set of sheets, said means including a pair of opposed rotary members, one rotary member being a glue applicator and the other rotary member being a back-up roll, and a mechanism for separating the rotary members as the set of sheets passes therebetween, means operable in timed relation to operation of the last-named means for receiving a set of sheets from the last-named means and arranging the sheets in an approximately registered condition, the second-named means including a rotary member having at least one suction nozzle for each sheet of the set of sheets except for the bottom sheet and being operable to successively pick up and place the upper sheets in registered relation onto the bottom sheet, means operable in timed relation to the second-named means for receiving a set of sheets from the second-named means and kicking or jogging the sheets both at the sides and ends thereof to accurately register the same, and means operable in timed relation to operation of the second-named means for gauging the thickness of the registered sheets and means for stopping the operation of the machine if the number of sheets is either more or less than the desired number of sheets.

18. A machine of the class described for operating on a spread set of sheets, comprising means for receiving and applying an adhesive material to exposed portions of the spread set of sheets, said means including a pair of opposed rotary members, one rotary member being a glue applicator and the other member being a back-up roll, and a mechanism for progressively separating the rotary members as the set of sheets passes therebetween, means operable in timed relation to operation of the last-named means for receiving a set of sheets from the last-named means and arranging the sheets in an approximately registered condition, the second-named means including a rotary member having at least one suction head for each sheet of a set except for the bottom sheet and being operable to successively pick up and place the upper sheets in registered relation onto the bottom sheet, a stop and a mechanism operable to interpose the stop in the line of travel of a set of sheets to allow the sheets to be abutted against the stop for registering purposes, and means operable in timed relation to operation of the second-named means for receiving a set of sheets from the second-named means and kicking or jogging the sheets at both the sides and ends thereof to accurately register the same.

19. A machine of the class described for operating on a spread set of sheets, comprising means for receiving and applying an adhesive material to exposed portions of the spread set of sheets, means operable in timed relation to operation of the last-named means for receiving a set of sheets from the last-named means and arranging the sheets in an approximately registered condition, means operable in timed relation to the operation of the second-named means for receiving a set of sheets from the second-named means and kicking or jogging the sheets both at the sides and at the ends thereof for accurately registering the same, and means operable in timed relation to operation of the third-named means for receiving the sheets from the third-named means and slitting the same into several portions.

20. A machine of the class described for operating on a spread set of sheets, comprising means for receiving and applying an adhesive material to exposed portions of the spread set of sheets, said means including a pair of opposed rotary members, one rotary member being a glue applicator and the other member being a back-up roll, and a mechanism for separating the rotary members as the set of sheets passes therebetween, means operable in timed relation to operation of the last-named means for receiving a set of sheets from the last-named means and arranging the sheets in an approximately registered condition, means operable in timed relation to operation of the second-named means for receiving a set of sheets from the second-named means and kicking or jogging the sheets both at the sides and ends for accurately registering the same, and means operable in timed relation to operation of the third-named means for receiving the sheets from the third-named means and slitting the same into several portions.

21. A machine of the class described for operating on a spread set of sheets, comprising means for receiving and applying an adhesive material to exposed portions of the spread set of sheets, said means including a pair of opposed rotary members, one rotary member being a glue applicator and the other member being a back-up roll, and a mechanism for separating the rotary members as the set of sheets passes therebetween, means operable in timed relation to operation of the last-named means for receiving a set of sheets from the last-named means and arranging the sheets in an approximately registered condition, the second-named means including a rotary member having at least one suction nozzle for each sheet of the set of sheets except for the bottom sheet and being operable to successively pick up and place the upper sheets in registered relation onto the bottom sheet, means operable in timed relation to the second-named means for receiving a set of sheets from the second-named means and kicking or jogging the sheets both at the sides and ends thereof to accurately register the same, and means operable in timed relation to operation of the third-named means for receiving the sheets from the third-named means and slitting the same into several portions.

22. A machine of the class described for operating on a spread set of sheets, comprising means for receiving and applying an adhesive material to exposed portions of the spread set of sheets, said means including a pair of opposed rotary members, one rotary member being a glue applicator and the other member being a back-up roll, and a mechanism for progressively separating the rotary members as the set of sheets passes therebetween, means operable in timed relation to operation of the last-named means for receiving a set of sheets from the last-named means and arranging the sheets in an approximately registered condition, the second-named means including a rotary member having at least one suction head for each sheet of a set except for the bottom sheet and being operable to successively pick up and place the upper sheets in registered relation onto the bottom sheet, a stop and a mechanism operable to interpose the stop in the line of travel of a set of sheets to allow the sheets to be abutted against the stop for registering purposes, and means operable in timed relation to operation of the second-named means for receiving a set of sheets from the second-named means and kicking or jogging the sheets at both the sides and ends thereof to accurately register the same, and means operable in timed relation to operation of the second-named means for gauging the thickness of the registered sheets and for stopping operation of the machine if the number of sheets is either more or less than the desired number.

23. A machine of the class described for operating on a spread set of sheets, comprising means for receiving and applying an adhesive material to exposed portions of the spread set of sheets, said means including a pair of opposed rotary members, one rotary member being a glue applicator and the other member being a back-up roll, and a mechanism for progressively separating the rotary members as the set of sheets passes therebetween, means operable in timed relation to operation of the last-named means for receiving a set of sheets from the last-named means and arranging the sheets in an approximately registered condition, the second-named means including a rotary member having at least one suction head for each sheet of a set except for the bottom sheet and being operable to successively pick up and place the upper sheets in registered relation onto the bottom sheet, a stop and a mechanism operable to interpose the stop in the line of travel of a set of sheets to allow the sheets to be abutted against the stop for registering purposes, means operable in timed relation to operation of the second-named means for receiving a set of sheets from the second-named means and kicking or jogging the sheets at both the sides and ends thereof to accurately register the same, and means operable in timed relation to operation of the third-named means for receiving the sheets from the third-named means and slitting the same into several portions.

24. A machine of the class described for operating on a spread set of sheets, comprising means for receiving and applying an adhesive material to exposed portions of the spread set of sheets, said means including a pair of opposed rotary members, one rotary member being a glue applicator and the other member being a back-up roll, and a mechanism for progressively separating the rotary members as the set of sheets passes therebetween, means operable in timed relation to operation of the last-named means for receiving a set of sheets from the last-named means and arranging the sheets in an approximately registered condition, the second-named means including a rotary member having at least one suction head for each sheet of a set except for the bottom sheet and being operable to successively pick up and place the upper sheets in registered relation onto the bottom sheet, a stop and a mechanism operable to interpose the stop in the line of travel of a set of sheets to allow the sheets to be abutted against the stop for registering purposes, means operable in timed relation to operation of the second-named means for receiving a set of sheets from the second-named means and kicking or jogging the sheets at both the sides and ends thereof to accurately register the same, and means operable in timed relation to operation of the third-named means for receiving the sheets from the third-named means and slitting the same into several portions, and means operable in timed relation to operation of the second-named means for gauging the thickness of the registered sheets prior to slitting for stopping operation of the machine if the number of the sheets is either more or less than a desired number.

25. A machine of the class described for operating on a spread set of sheets, comprising means for receiving and applying an adhesive material to exposed portions of the spread set of sheets, means operable in timed relation to operation of the last-named means for receiving a set of sheets from the last-named means and arranging the sheets in an approximately registered condition, means operable in timed relation to the operation of the second-named means for receiving a set of sheets from the second-named means and kicking or jogging the sheet both at the sides and at the ends thereof for accurately registering the same, and means operable in timed relation to operation of the third-named means for pressing the glued margins of the sheets together beginning from the outer edges thereof and progressing inwardly.

26. A machine of the class described for operating on a spread set of sheets, comprising means for receiving and applying an adhesive material to exposed portions of the spread set of sheets, said means including a pair of opposed rotary members, one rotary member being a glue applicator and the other member being a back-up roll, and a mechanism for separating the rotary members as the set of sheets passes therebetween, means operable in timed relation to operation of the last-named means for receiving a set of sheets from the last-named means and arranging the sheets in an approximately registered condition, means operable in timed relation to operation of the second-named means for receiving a set of sheets from the second-named means and kicking or jogging the sheets both at the sides and ends for accurately registering the same, and means operable in timed relation to operation of the third-named means for pressing the glued margins of the sheets together beginning from the outer edges thereof and progressing inwardly.

27. A machine of class described for operating on a spread set of sheets, comprising means for receiving and applying an adhesive material to exposed portions of the spread set of sheets, said means including a pair of opposed rotary members, one rotary member being a glue applicator and the other member being a back-up roll, and a mechanism for separating the rotary members as the set of sheets passes therebetween, means operable in timed relation to operation of the last-named means for receiving a set of sheets from the last-named means and arranging the sheets in an approximately registered condition, the second-named means including a rotary member having at least one suction nozzle for each sheet of the set of sheets except for the bottom sheet and being operable to successively pick up and place the upper sheets in registered relation onto the bottom sheet, means operable in timed relation to the second-named means for receiving a set of sheets from the second-named means and kicking or jogging the sheets both at the sides and ends thereof to accurately register the same, and means operable in timed relation to operation of the third-named means for pressing the glued margins of the sheets together beginning from the outer edges thereof and progressing inwardly.

28. A machine of the class described for operating on a spread set of sheets, comprising means for receiving and applying an adhesive material to exposed portions of the spread set of sheets, said means including a pair of opposed rotary members, one rotary member being a glue applicator and the other member being a back-up roll, and a mechanism for progressively separating the rotary members as the set of sheets passes therebetween, means operable in timed relation to operation of the last-named means for receiving a set of sheets from the last-named means and arranging the sheets in an approximately registered condition, the second-named means including a rotary member having at least one suction head for each sheet of a set except for the bottom sheet and being operable to successively pick up and place the upper sheets in registered relation onto the bottom sheet, a stop and a mechanism operable to interpose the stop in the line of travel of a set of sheets to allow the sheets to be abutted against the stop for registering purposes, means operable in timed relation to operation of the second-named means for receiving a set of sheets from the second-named means and kicking or jogging the sheets at both the sides and ends thereof to accurately register the same, and means operable in timed relation to operation of the third-named means for pressing the glued margins of the sheets together beginning from the outer edges thereof and progressing inwardly.

29. A machine of the class described for operating on a spread set of sheets, comprising means for receiving and applying an adhesive material to exposed portions of the spread set of sheets, said means including a pair of opposed rotary members, one rotary member being a glue applicator and the other member being a back-up roll, and a mechanism for progressively separating the rotary members as the set of sheets passes therebetween, means operable in timed relation to operation of the last-named means for receiving a set of sheets from the last-named means and arranging the sheets in an approximately registered condition, the second-named means including a rotary member having at least one suction head for each sheet of a set except for the bottom sheet and being operable to successively pick up and place the upper sheets in registered relation onto the bottom sheet, a stop and a mechanism operable to interpose the stop in the line of travel of a set of sheets to allow the sheets to be abutted against the stop for registering purposes, means operable in timed relation to operation of the second-named means for receiving a set of sheets from the second-named means and kicking or jogging the sheets at both the sides and ends thereof to accurately register the same, means operable in timed relation to operation of the third-named means for pressing the glued margins of the sheets together beginning from the outer edges thereof and progressing inwardly, and means operable in timed relation to operation of the second-named means for gauging the thickness of the registered sheets and for stopping operation of the machine if the number of sheets is either more or less than a desired number.

30. A machine of the class described for operating on a spread set of sheets, comprising means for receiving and applying an adhesive material to exposed portions of the spread set of sheets, means operable in timed relation to operation of the last-named means for receiving a set of sheets from the last-named means and arranging the sheets in an approximately registered condition, means operable in timed relation to the operation of the second-named means for receiving a set of sheets from the second-named means and kicking or jogging the sheets both at the sides and at the ends thereof for accurately registering the same, means operable in timed relation to operation of the third-named means for pressing the glued margins of the sheets together beginning from the outer edges thereof and progressing inwardly, and means operable in timed relation to operation of the second-named means for gauging the thickness of the registered sheets and for stopping operation of the machine if the number of sheets is either more or less than a desired number.

31. A machine of the class described for operating on a spread set of sheets, comprising means for receiving and applying an adhesive material to exposed portions of the spread set of sheets, means operable in timed relation to operation of the last-named means for receiving the treated set of sheets from the last-named means and arranging them in registered fashion, and means operable to press the treated portions of the sheets together, the first-named means including a rotary member having circumferentially spaced axially extending glue applicator members for successively applying adhesive material to exposed portions of the spread set of sheets as the sheets are conveyed thereby, and conveying means for conveying the sheets past the rotary member, the second-named means including a rotary member having circumferentially spaced sheet pick-up devices, the last-named rotary member being driven in timed relation to rotation of the first-named rotary member so that the circumferentially spaced sheet pick-up devices are arranged in a predetermined orientation and moved in said orientation with respect to the glue applicator members of the first-named rotary member, said last-named rotary member, when rotated, being operable to pick up the penultimate sheet first, and then the upper sheets in order and place them one on top of the other with the bottom sheet bottommost, conveying means for conveying the sheets from the first-named rotary member to said last-named rotary member, and stop means against which the bottom sheet is adapted to abut and against which the other sheets are adapted to be brought by the sheet pick-up devices.

32. A machine of the class described for operating on a spread set of sheets, comprising means for receiving and applying an adhesive material to exposed portions of a spread set of sheets, and means operable in timed relation to operation of the last-named means for receiving the treated set of sheets from the last-named means and arranging them in registered fashion, the first-named means including a rotary member having circumferentially spaced axially extending glue applicator members for successively applying adhesive material to exposed portions of the spread set of sheets as the sheets are conveyed thereby, and conveying means for conveying the sheets past the rotary member, the second-named means including a rotary member having circumferentially spaced sheet pick-up devices, the last-named rotary member being driven in timed relation to rotation of the first-named rotary member so that the circumferentially spaced sheet pick-up devices are arranged in a predetermined orientation and moved in said orientation with respect to the glue applicator members of the first-named rotary member, said last-named rotary member, when rotated, being operable to pick up the penultimate sheet first, and then the upper sheets in order and place them one on top of the other with the bottom sheet bottommost, conveying means for conveying the sheets from the first-named rotary member to said last-named rotary member, and stop means against which the bottom sheet is adapted to abut and against which the other sheets are adapted to be brought by the sheet pick-up devices.

33. A machine of the class described for applying an adhesive material to a spread set of sheets, comprising a pair of opposed rotary members, one rotary member being a glue applicator and the other member being a back-up roller, and a mechanism for progressively separating the rotary members as the set of sheets passes therebetween.

34. A machine of the class described for operating on a spread set of sheets, comprising means for receiving and applying an adhesive material to exposed portions of a spread set of sheets, means operable in timed relation to operation of the last-named means for receiving the treated set of sheets from the last-named means and arranging them in registered fashion, means operable to press the treated portions of the sheets, the first-named means including a pair of opposed rotary members, one rotary member being a glue applicator and the other member being a back-up roll, and a mechanism for progressively separating the rotary members as the set of sheets pass therebetween, the glue applicator having circumferentially spaced axially extending glue applicator members for successively applying an adhesive material to the spread set of sheets as the sheets are conveyed thereby, and conveyor means for conveying the sheets between the rotary members, the second-named means including a rotary member having circumferentially spaced sheet pick-up devices, the last-named rotary member being driven in timed relation to rotation of the first-named rotary member so that the circumferentially spaced sheet pick-up devices are arranged in a predetermined orientation and moved in said orientation with respect to the glue applicator members of the first-named rotary member, said last-named rotary member, when rotated, being operable to pick up the penultimate sheet first, and then the upper sheets in order and place them one on top of the other with the bottom sheet bottommost, conveying means for conveying the sheets from the first-named rotary member to said last-named rotary member, and stop means against which the bottom sheet is adapted to abut and against which the other sheets are adapted to be brought by the sheet pick-up devices.

35. A machine of the class described for operating on a spread set of sheets having an adhesive material applied to exposed portions of the spread set of sheets, comprising means for receiving the treated set of sheets and arranging them in registered fashion, and means operable to press the treated portions of sheets together, the first-named means including a rotary member having a plurality of suction nozzles operable to successively pick up and arrange the upper sheets in registered relation with respect to the bottom sheet, a stop mechanism operable to interpose a stop in the line of travel of a set of sheets to allow the sheets to be abutted against the stop for registering purposes.

36. A machine of the class described for operating on a spread set of sheets having an adhesive material applied to exposed portions of the spread set of sheets, comprising means for receiving a treated set of sheets and arranging the sheets in approximately registered condition, and means operable in timed relation to operation of the first-named means for receiving the set of sheets from the first-named means and kicking or jogging the sheets both at the sides and at the ends thereof for accurately registering the same.

37. A machine of the class described for operating on a spread set of sheets having an adhesive material applied to exposed portions of the spread set of sheets, comprising means for receiving a treated set of sheets and arranging the sheets in approximately registered condition, means operable in timed relation to operation of the first-named means for receiving a set of sheets from the first-named means and kicking or jogging the sheets both at the sides and at the ends thereof for accurately registering the same, and means operable in timed relation to operation of the first-named means for gauging the thickness of the registered set of sheets for stopping operation of the machine if the number of sheets is more or less than a desired number of sheets.

38. A machine of the class described for operating on a spread set of sheets having an adhesive material applied to exposed portions of the spread set of sheets, comprising means for receiving a treated set of sheets and arranging the sheets in approximately registered condition, means operable in timed relation to operation of the first-named means for receiving the set of sheets from the first-named means and kicking or jogging the sheets both at the sides and at the ends thereof for accurately registering the same, and means operable in timed relation to operation of the second-named means for pressing the glued margins of the sheets together beginning at the outer edges thereof and progressing inwardly.

39. A machine of the class described for operating on a spread set of sheets having an adhesive material applied to exposed portions of the spread set of sheets, comprising means for receiving a treated set of sheets and arranging the sheets in approximately registered condition, means operable in timed relation to operation of the first-named means for receiving a set of sheets from the first-named means and kicking or jogging the sheets at both sides and at the ends thereof for accurately registering the same, means operable in timed relation to operation of the second-named means for pressing the glued margins of the sheets together beginning from the outer ends thereof and progressing inwardly, and means operable in timed relation to operation of the first-named means for gauging the thickness of the registered sheets and for stopping operation of the machine if the number of sheets is either more or less than a desired number.

References Cited in the file of this patent

UNITED STATES PATENTS

| 1,015,716 | Seymour | Jan. 23, 1912 |
| 2,024,932 | Kushera | Dec. 17, 1935 |
| 2,371,179 | Mendes | Mar. 13, 1945 |
| 2,573,612 | Scheinker | Oct. 30, 1951 |
| 2,589,428 | Pearce | Mar. 18, 1952 |